US012743097B2

(12) United States Patent
Gehtman et al.

(10) Patent No.: US 12,743,097 B2
(45) Date of Patent: Sep. 22, 2026

(54) ADVANCE ORIENTATION OF A DRONE ANTENNA

(71) Applicant: Dell Products L.P., Round Rock, TX (US)

(72) Inventors: Yevgeni Gehtman, Modi'in (IL); Tomer Shachar, Beer-Sheva (IL); Arieh Don, Newton, MA (US)

(73) Assignee: Dell Products L.P., Round Rock, TX (US)

(*) Notice: Subject to any disclaimer, the term of this patent is extended or adjusted under 35 U.S.C. 154(b) by 139 days.

(21) Appl. No.: 18/757,350

(22) Filed: Jun. 27, 2024

(65) Prior Publication Data

US 2026/0003359 A1 Jan. 1, 2026

(51) Int. Cl.
*G05D 1/24* (2024.01)
*G05D 1/246* (2024.01)
(Continued)

(52) U.S. Cl.
CPC ............. *G05D 1/247* (2024.01); *G05D 1/246* (2024.01); *H04B 10/116* (2013.01)

(58) Field of Classification Search
CPC ...................................................... G05D 1/247
(Continued)

(56) References Cited

U.S. PATENT DOCUMENTS

| | | | |
|---|---|---|---|
| 8,588,870 | B1 | 11/2013 | Vargantwar |
| 10,224,739 | B2 | 3/2019 | Kaag |

(Continued)

FOREIGN PATENT DOCUMENTS

| | | | | | |
|---|---|---|---|---|---|
| CA | 3206977 | A1 * | 5/2024 | .......... | G05D 1/6987 |
| CN | 110673093 | A * | 1/2020 | .............. | G01S 5/16 |

(Continued)

OTHER PUBLICATIONS

Shachar et al. "Non-Interrupted Remote Device Backup to a Cloud Platform" U.S. Appl. No. 18/656,162, filed May 6, 2024, 44 pages.

(Continued)

*Primary Examiner* — Harry K Liu

(74) *Attorney, Agent, or Firm* — Amin, Turocy & Watson, LLP

(57) ABSTRACT

A system can maintain mapping information applicable to a physical area that corresponds to a device. The system can physically navigate the system toward the device, wherein the device is configured to emit light-based communications substantially vertically, and wherein the device does not comprise any internet connectivity capability. The system can, while physically navigating the system toward the device and based on the mapping information, adjust a position of the light-based communications antenna relative to another part of the system other than the light-based communications antenna. The system can, after physically navigating the system toward the device, attempt to establish a light-based communications channel with the device. The system can, based on a result of the attempt indicating success in establishing the light-based communications channel with the device, receive data from the device via the light-based communications channel.

20 Claims, 13 Drawing Sheets

(51) Int. Cl.
*G05D 1/247* (2024.01)
*H04B 10/116* (2013.01)

(58) Field of Classification Search
USPC .......................................................... 342/422
See application file for complete search history.

(56) References Cited

U.S. PATENT DOCUMENTS

| | | | | |
|---|---|---|---|---|
| 10,797,863 | B2 | 10/2020 | Chen et al. | |
| 11,169,510 | B2 | 11/2021 | Menzel et al. | |
| 12,117,304 | B2 | 10/2024 | Quint et al. | |
| 12,148,311 | B2 | 11/2024 | Yogesha et al. | |
| 12,468,045 | B1 | 11/2025 | Pottle | |
| 2013/0179057 | A1 | 7/2013 | Fisher et al. | |
| 2013/0315604 | A1 | 11/2013 | LoPresti | |
| 2015/0345984 | A1 | 12/2015 | Graham | |
| 2020/0119805 | A1 | 4/2020 | Miyakawa | |
| 2020/0389232 | A1 | 12/2020 | Danesh | |
| 2021/0065073 | A1 | 3/2021 | Maeda et al. | |
| 2021/0213935 | A1 | 7/2021 | Lu | |
| 2021/0389143 | A1 | 12/2021 | Kim et al. | |
| 2021/0407303 | A1 | 12/2021 | Yogesha et al. | |
| 2022/0161815 | A1 | 5/2022 | Van Beek et al. | |
| 2023/0281847 | A1 | 9/2023 | Zhong et al. | |
| 2024/0039339 | A1* | 2/2024 | Park | H02J 50/90 |
| 2024/0340083 | A1 | 10/2024 | Hariq | |
| 2024/0411314 | A1 | 12/2024 | Manouchehri et al. | |
| 2025/0060749 | A1 | 2/2025 | Hall | |
| 2025/0112697 | A1 | 4/2025 | Mangio | |
| 2025/0206331 | A1* | 6/2025 | Sane | B60W 50/0205 |
| 2025/0253948 | A1 | 8/2025 | Quintana Sanchez | |
| 2025/0297867 | A1 | 9/2025 | Liu | |

FOREIGN PATENT DOCUMENTS

| | | | | | |
|---|---|---|---|---|---|
| CN | 216357320 | U | * | 4/2022 | |
| CN | 121308845 | A | * | 1/2026 | |
| JP | 7429908 | B2 | * | 2/2024 | G01S 7/4817 |
| KR | 102193973 | B1 | * | 12/2020 | F42B 15/01 |
| WO | WO-2017174819 | A1 | * | 10/2017 | G01S 19/11 |
| WO | WO-2021203242 | A1 | * | 10/2021 | G06N 3/063 |

OTHER PUBLICATIONS

Gehtman, et al. "Drone Decision-Making for Task Completion" U.S. Appl. No. 18/757,355, filed Jun. 27, 2024, 44 pages.
Gehtman, et al. "Drone Pre-Mapping" U.S. Appl. No. 18/757,389, filed Jun. 27, 2024, 44 pages.
Office Action mailed Jan. 12, 2026 for U.S. Appl. No. 18/757,355, 41 pages.
Office Action mailed Nov. 14, 2025 for U.S. Appl. No. 18/757,389, 107 pages.
Office Action mailed Jun. 3, 2026 for U.S. Appl. No. 18/656,162, 39 pages.
Final Office Action mailed Jun. 3, 2026 for U.S. Appl. No. 18/757,355, 61 pages.
Notice of Allowance mailed Apr. 14, 2026 for U.S. Appl. No. 18/757,389, 359 pages.

* cited by examiner

600

MAINTAINING MAPPING INFORMATION APPLICABLE TO A PHYSICAL AREA THAT CORRESPONDS TO A DEVICE 604

PHYSICALLY NAVIGATING THE SYSTEM TOWARD THE DEVICE, WHEREIN THE DEVICE IS CONFIGURED TO EMIT LIGHT-BASED COMMUNICATIONS SUBSTANTIALLY VERTICALLY, AND WHEREIN THE DEVICE DOES NOT COMPRISE ANY INTERNET CONNECTIVITY CAPABILITY 606

WHILE PHYSICALLY NAVIGATING THE SYSTEM TOWARD THE DEVICE AND BASED ON THE MAPPING INFORMATION, ADJUSTING A POSITION OF THE LIGHT-BASED COMMUNICATIONS ANTENNA RELATIVE TO ANOTHER PART OF THE SYSTEM OTHER THAN THE LIGHT-BASED COMMUNICATIONS ANTENNA 608

AFTER PHYSICALLY NAVIGATING THE SYSTEM TOWARD THE DEVICE, ATTEMPTING TO ESTABLISH A LIGHT-BASED COMMUNICATIONS CHANNEL WITH THE DEVICE 610

BASED ON A RESULT OF THE ATTEMPTING INDICATING SUCCESS IN ESTABLISHING THE LIGHT-BASED COMMUNICATIONS CHANNEL WITH THE DEVICE, RECEIVING DATA FROM THE DEVICE VIA THE LIGHT-BASED COMMUNICATIONS CHANNEL 612

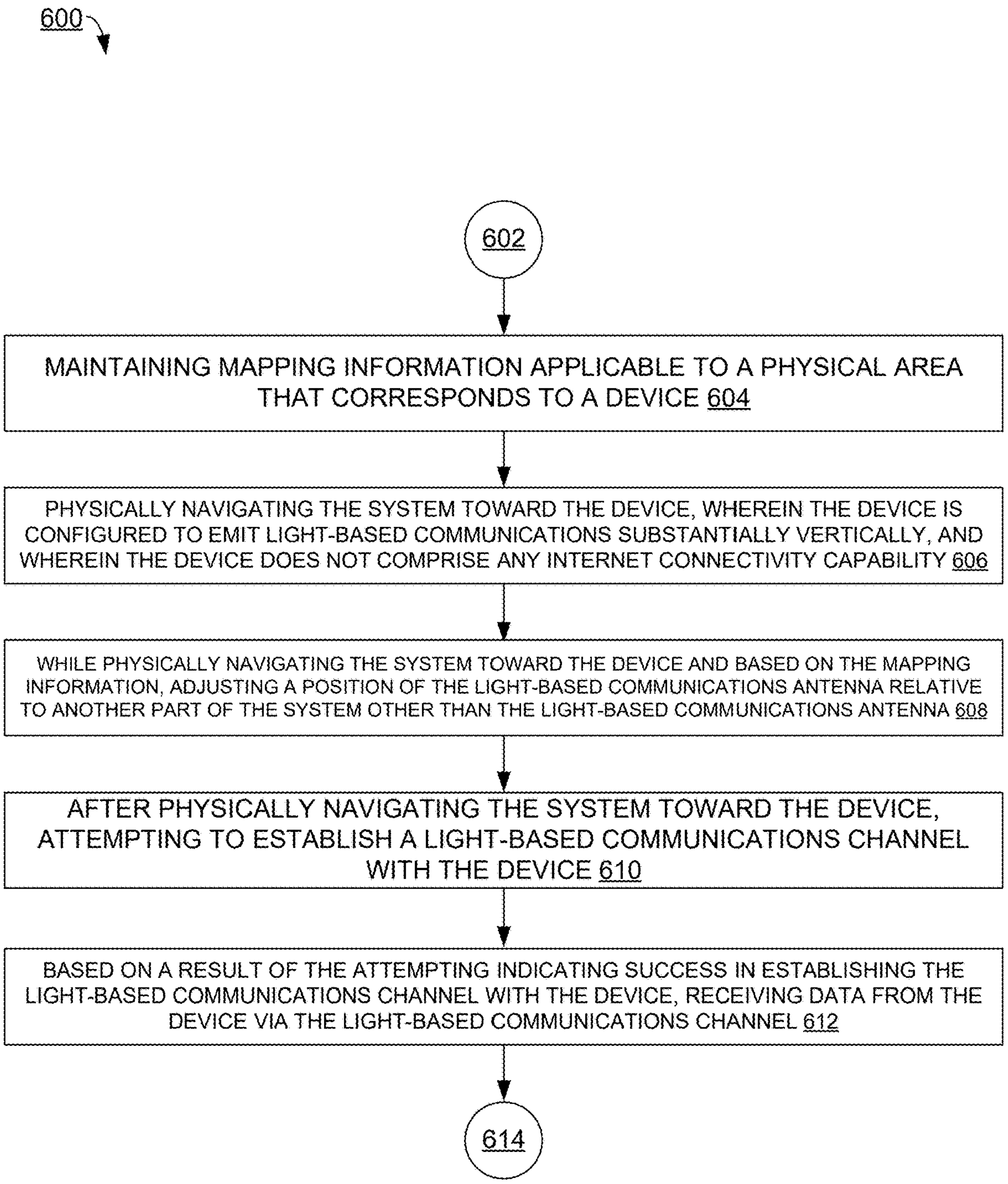

MOVING A SYSTEM TOWARD A DEVICE, WHEREIN THE DEVICE IS CONFIGURED TO EMIT LIGHT-BASED COMMUNICATIONS, AND WHEREIN THE DEVICE OMITS INTERNET CONNECTIVITY 704

WHILE MOVING THE SYSTEM TOWARD THE DEVICE, ADJUSTING A POSITION OF A LIGHT-BASED COMMUNICATIONS ANTENNA RELATIVE TO ANOTHER PART OF THE SYSTEM BASED ON MAPPING INFORMATION 706

AFTER MOVING THE SYSTEM TOWARD THE DEVICE, ATTEMPTING TO ESTABLISH A LIGHT-BASED COMMUNICATIONS CHANNEL WITH THE DEVICE TO PRODUCE A RESULT 708

BASED ON THE RESULT INDICATING SUCCESS IN ESTABLISHING THE LIGHT-BASED COMMUNICATIONS CHANNEL WITH THE DEVICE, RECEIVING DATA FROM THE DEVICE VIA THE LIGHT-BASED COMMUNICATIONS CHANNEL 710

712

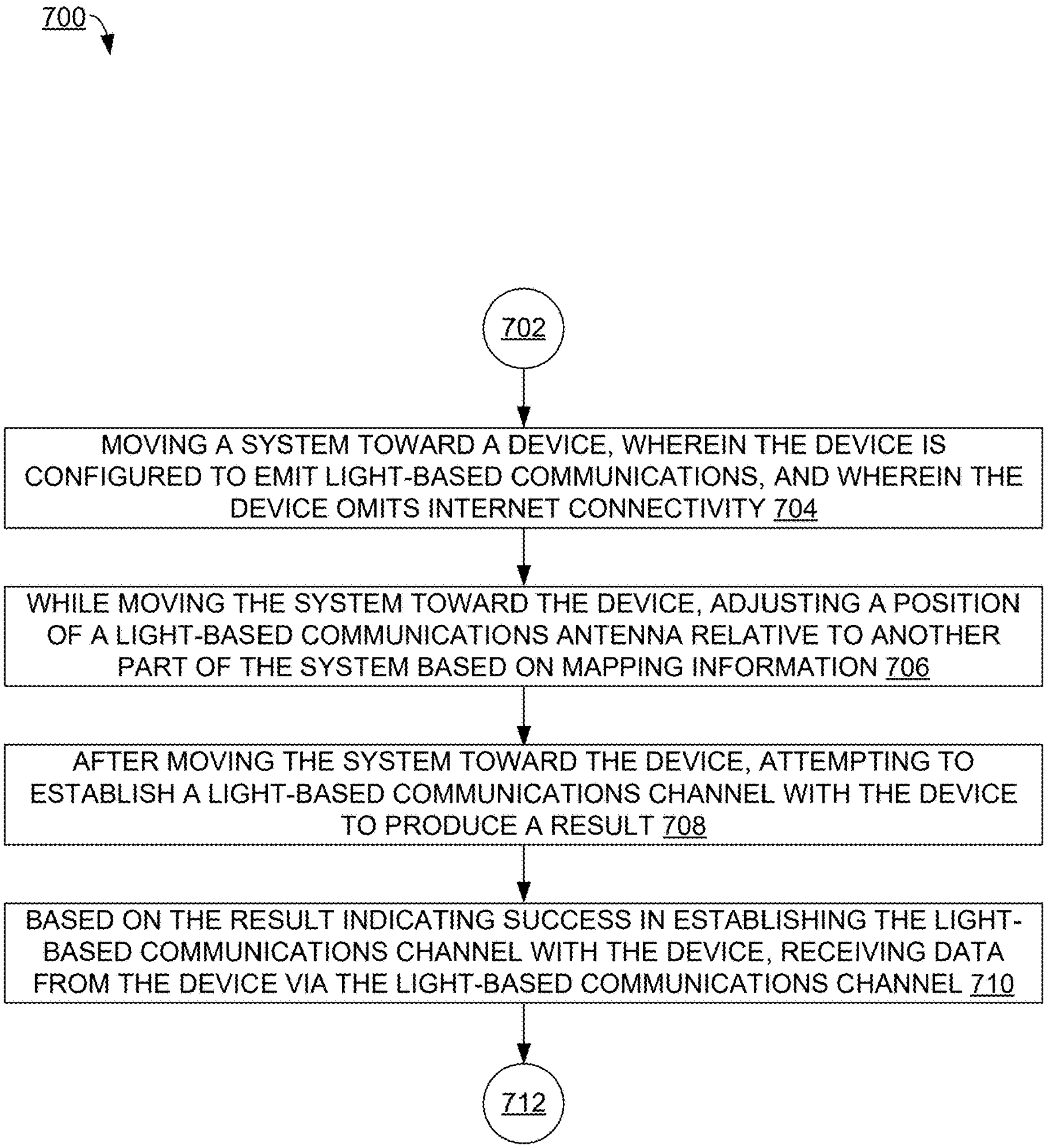

MOVING THE SYSTEM TOWARD THE DEVICE BASED ON THE MAPPING INFORMATION, WHEREIN THE MAPPING INFORMATION INDICATES A PLACE WHERE THERE IS A LINE-OF-SIGHT FROM THE SYSTEM TO THE DEVICE 804

ESTABLISHING THE LIGHT-BASED COMMUNICATIONS CHANNEL BASED ON MOVING THE SYSTEM TOWARD THE DEVICE BASED ON THE MAPPING INFORMATION MORE QUICKLY THAN ESTABLISHING THE LIGHT-BASED COMMUNICATIONS CHANNEL BASED ON MOVING THE SYSTEM TOWARD THE DEVICE INDEPENDENT OF INFORMATION ABOUT THE PLACE WHERE THERE IS THE LINE-OF-SIGHT 806

808

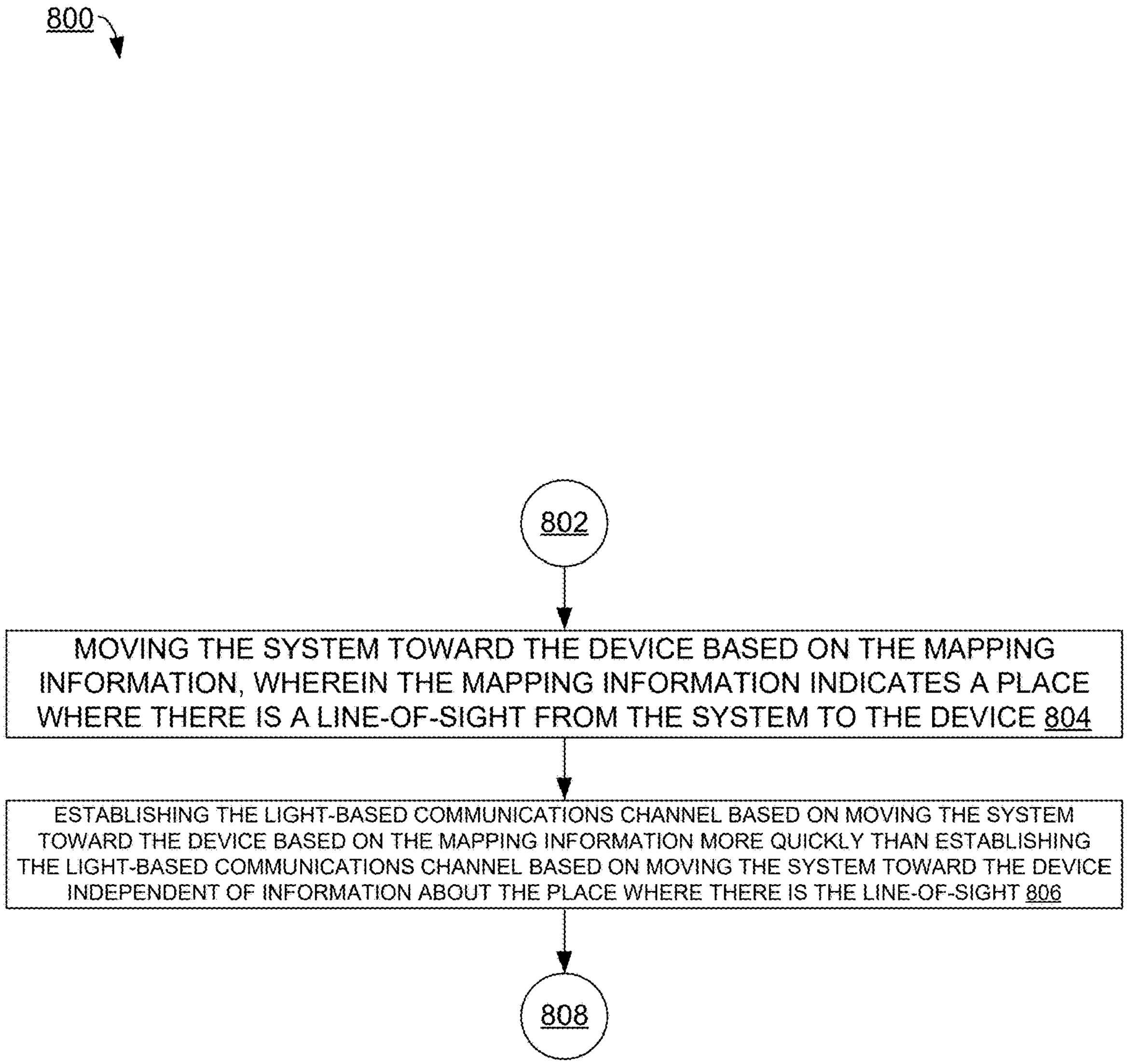

FIG. 8

MOVING THE SYSTEM TOWARD THE DEVICE BASED ON THE MAPPING INFORMATION, WHEREIN THE MAPPING INFORMATION INDICATES A PLACE WHERE THERE IS A LINE-OF-SIGHT FROM THE SYSTEM TO THE DEVICE 904

ESTABLISHING THE LIGHT-BASED COMMUNICATIONS CHANNEL BASED ON ADJUSTING THE POSITION OF THE LIGHT-BASED COMMUNICATIONS ANTENNA WHILE MOVING THE SYSTEM TOWARD THE DEVICE MORE QUICKLY THAN ESTABLISHING THE LIGHT-BASED COMMUNICATIONS CHANNEL BASED ON ADJUSTING THE POSITION OF THE LIGHT-BASED COMMUNICATIONS ANTENNA AFTER MOVING THE SYSTEM TOWARD THE DEVICE. THAT IS, PRE-ORIENTING A DRONE'S ANTENNA CAN REDUCE A PROBING TIMELINE FOR ESTABLISHING A LIFI CONNECTION WITH A DEVICE RELATIVE TO NOT PRE-ORIENTING THE DRONE'S ANTENNA 906

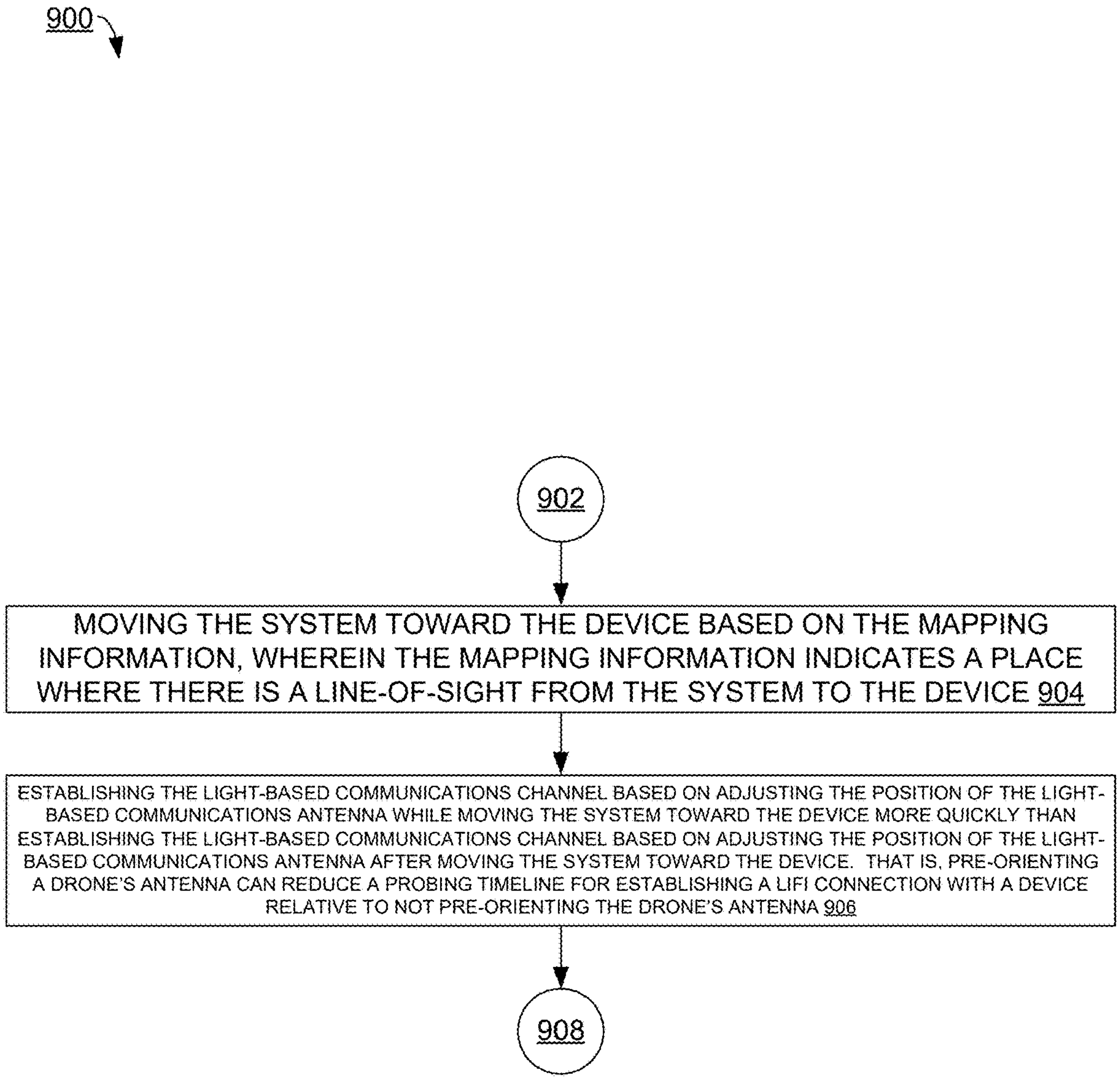

MOVING THE SYSTEM TOWARD THE DEVICE BASED ON THE MAPPING INFORMATION, WHEREIN THE MAPPING INFORMATION INDICATES A PLACE WHERE THERE IS A LINE-OF-SIGHT FROM THE SYSTEM TO THE DEVICE 1004

ESTABLISHING THE LIGHT-BASED COMMUNICATIONS CHANNEL BASED ON ADJUSTING THE POSITION OF THE LIGHT-BASED COMMUNICATIONS ANTENNA WHILE MOVING THE SYSTEM TOWARD THE DEVICE MORE QUICKLY THAN ESTABLISHING THE LIGHT-BASED COMMUNICATIONS CHANNEL BASED ON REFRAINING FROM ADJUSTING THE POSITION OF THE LIGHT-BASED COMMUNICATIONS ANTENNA 1006

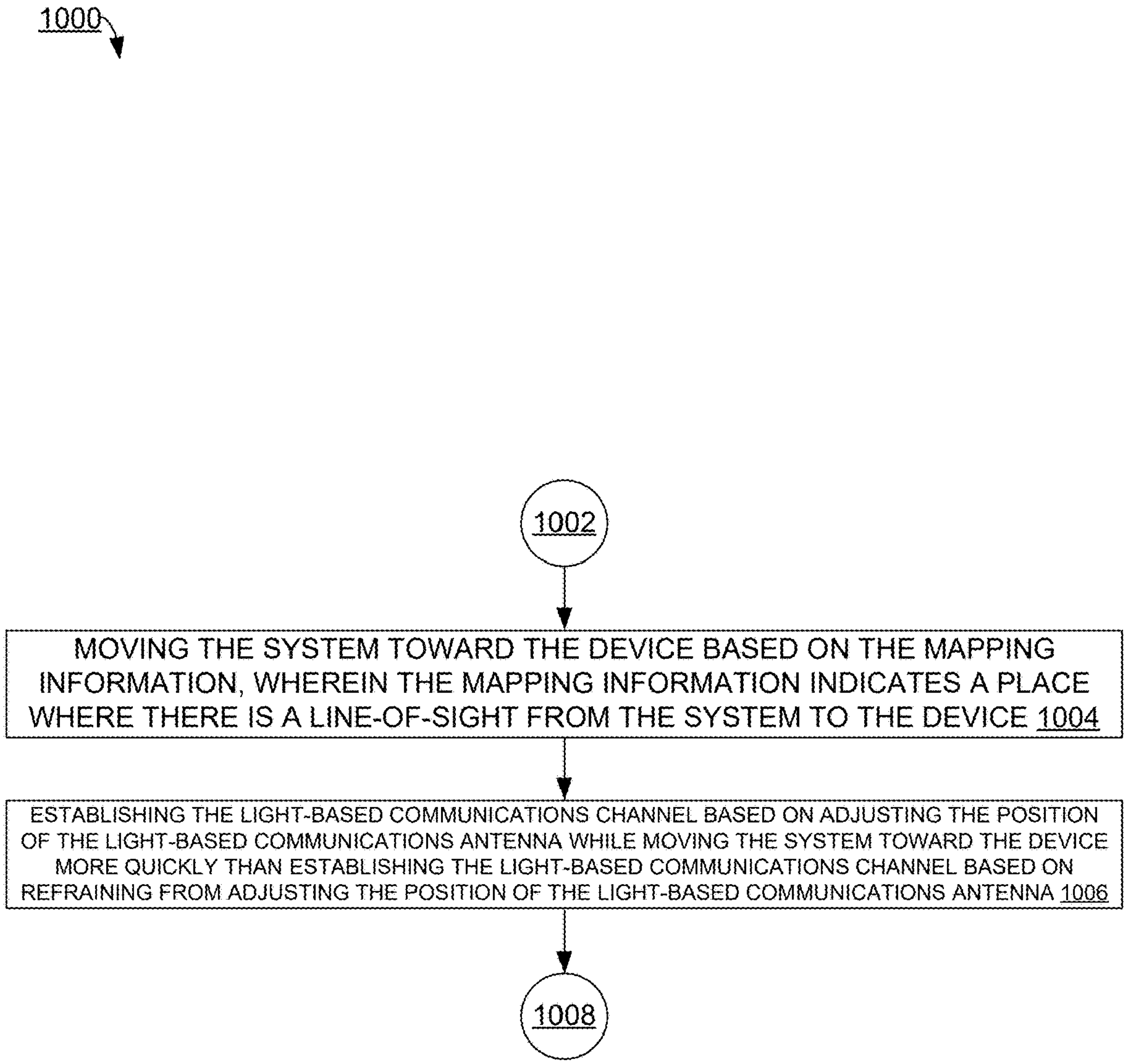

WHILE MOVING THE SYSTEM TOWARD A DEVICE AND BASED ON MAPPING INFORMATION, ADJUSTING A POSITION OF AN ANTENNA RELATIVE TO ANOTHER PART OF THE SYSTEM OTHER THAN THE ANTENNA 1104

AFTER MOVING THE SYSTEM TOWARD THE DEVICE, ATTEMPTING TO ESTABLISH A COMMUNICATIONS CHANNEL WITH THE DEVICE, AND USING THE ANTENNA 1106

BASED ON A RESULT OF THE ATTEMPTING INDICATING SUCCESS IN ESTABLISHING THE COMMUNICATIONS CHANNEL WITH THE DEVICE, RECEIVING DATA FROM THE DEVICE VIA THE COMMUNICATIONS CHANNEL 1108

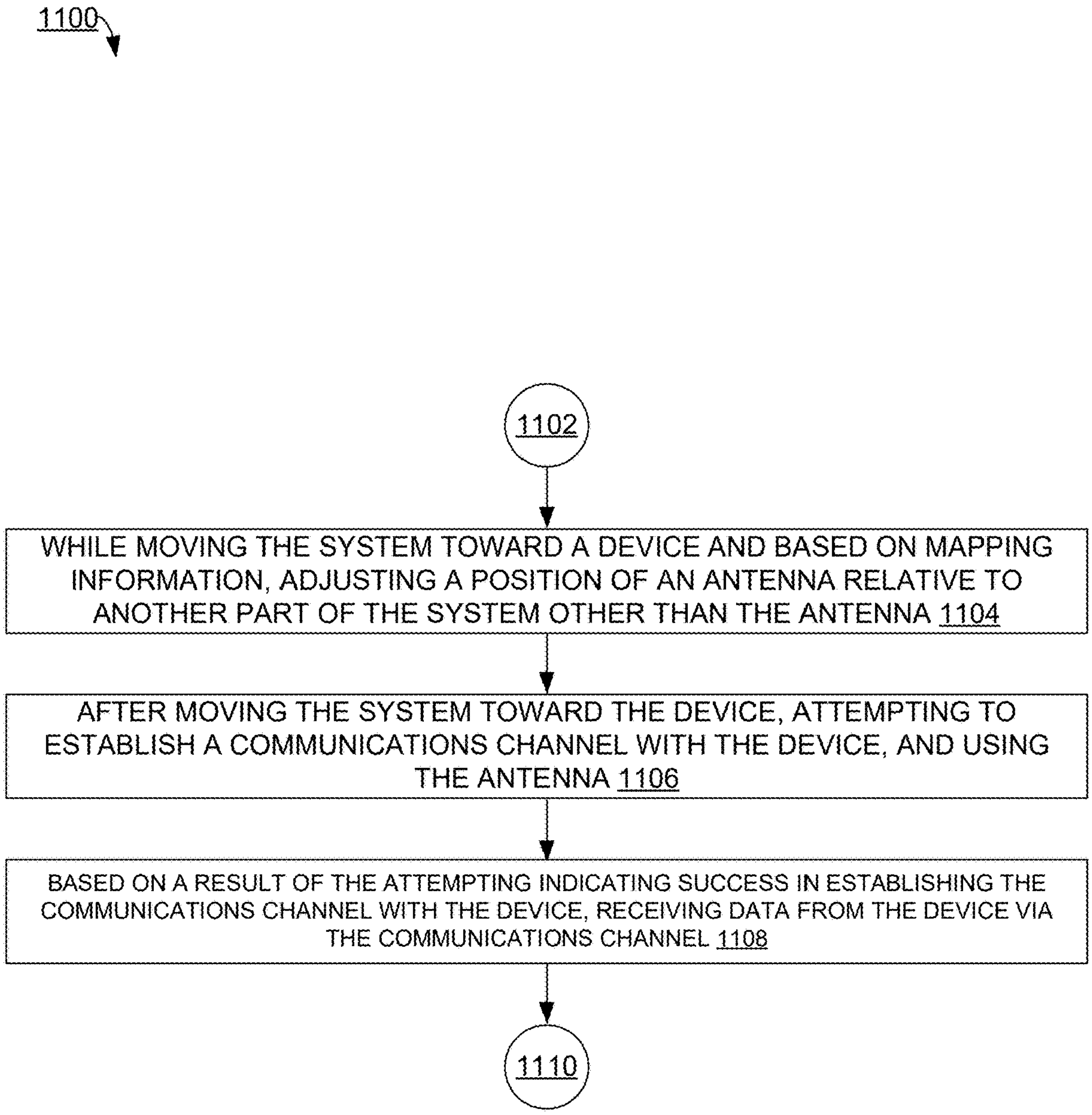

UPDATING THE MAPPING INFORMATION TO PRODUCE UPDATED MAPPING INFORMATION 1204

WHILE MOVING THE SYSTEM TOWARD THE DEVICE A SECOND TIME, ADJUSTING THE POSITION OF THE COMMUNICATIONS ANTENNA RELATIVE TO THE OTHER PART OF THE SYSTEM BASED ON THE UPDATED MAPPING INFORMATION 1206

ADVANCE ORIENTATION OF A DRONE ANTENNA

RELATED APPLICATIONS

The subject patent application is related by subject matter to, U.S. patent application Ser. No. 18/757,355, filed Jun. 27, 2024 and entitled "DRONE DECISION-MAKING FOR TASK COMPLETION," the entirety of which application is hereby incorporated by reference herein.

The subject patent application is related by subject matter to, U.S. patent application Ser. No. 18/757,389, filed Jun. 27, 2024 and entitled "DRONE PRE-MAPPING," the entirety of which application is hereby incorporated by reference herein.

BACKGROUND

Data can be transferred via wireless protocols.

SUMMARY

The following presents a simplified summary of the disclosed subject matter in order to provide a basic understanding of some of the various embodiments. This summary is not an extensive overview of the various embodiments. It is intended neither to identify key or critical elements of the various embodiments nor to delineate the scope of the various embodiments. Its sole purpose is to present some concepts of the disclosure in a streamlined form as a prelude to the more detailed description that is presented later.

An example system can operate as follows. The system can maintain mapping information applicable to a physical area that corresponds to a device. The system can physically navigate the system toward the device, wherein the device is configured to emit light-based communications substantially vertically, and wherein the device does not comprise any internet connectivity capability. The system can, while physically navigating the system toward the device and based on the mapping information, adjust a position of the light-based communications antenna relative to another part of the system other than the light-based communications antenna. The system can, after physically navigating the system toward the device, attempt to establish a light-based communications channel with the device. The system can, based on a result of the attempt indicating success in establishing the light-based communications channel with the device, receive data from the device via the light-based communications channel.

An example method can comprise moving a system, by the system comprising at least one processor, toward a device, wherein the device is configured to emit light-based communications, and wherein the device omits internet connectivity. The method can further comprise, while moving the system toward the device, adjusting, by the system, a position of a light-based communications antenna relative to another part of the system based on mapping information. The method can further comprise, after moving the system toward the device, attempting, by the system, to establish a light-based communications channel with the device to produce a result. The method can further comprise, based on the result indicating success in establishing the light-based communications channel with the device, receiving, by the system, data from the device via the light-based communications channel.

An example non-transitory computer-readable medium can comprise instructions that, in response to execution, cause a system comprising a processor to perform operations. These operations can comprise, while moving the system toward a device and based on mapping information, adjusting a position of an antenna relative to another part of the system other than the antenna. These operations can further comprise, after moving the system toward the device, attempting to establish a communications channel with the device, and using the antenna. These operations can further comprise, based on a result of the attempting indicating success in establishing the communications channel with the device, receiving data from the device via the communications channel.

BRIEF DESCRIPTION OF THE DRAWINGS

Numerous embodiments, objects, and advantages of the present embodiments will be apparent upon consideration of the following detailed description, taken in conjunction with the accompanying drawings, in which like reference characters refer to like parts throughout, and in which:

FIG. 6 illustrates an example process flow that can facilitate advance orientation of a drone antenna, in accordance with an embodiment of this disclosure;

FIG. 7 illustrates another example process flow that can facilitate advance orientation of a drone antenna, in accordance with an embodiment of this disclosure;

FIG. 8 illustrates another example process flow that can facilitate advance orientation of a drone antenna, in accordance with an embodiment of this disclosure;

FIG. 9 illustrates another example process flow that can facilitate advance orientation of a drone antenna, in accordance with an embodiment of this disclosure;

FIG. 10 illustrates another example process flow that can facilitate advance orientation of a drone antenna, in accordance with an embodiment of this disclosure;

FIG. 11 illustrates another example process flow that can facilitate advance orientation of a drone antenna, in accordance with an embodiment of this disclosure;

DETAILED DESCRIPTION

Overview

Figure 1:
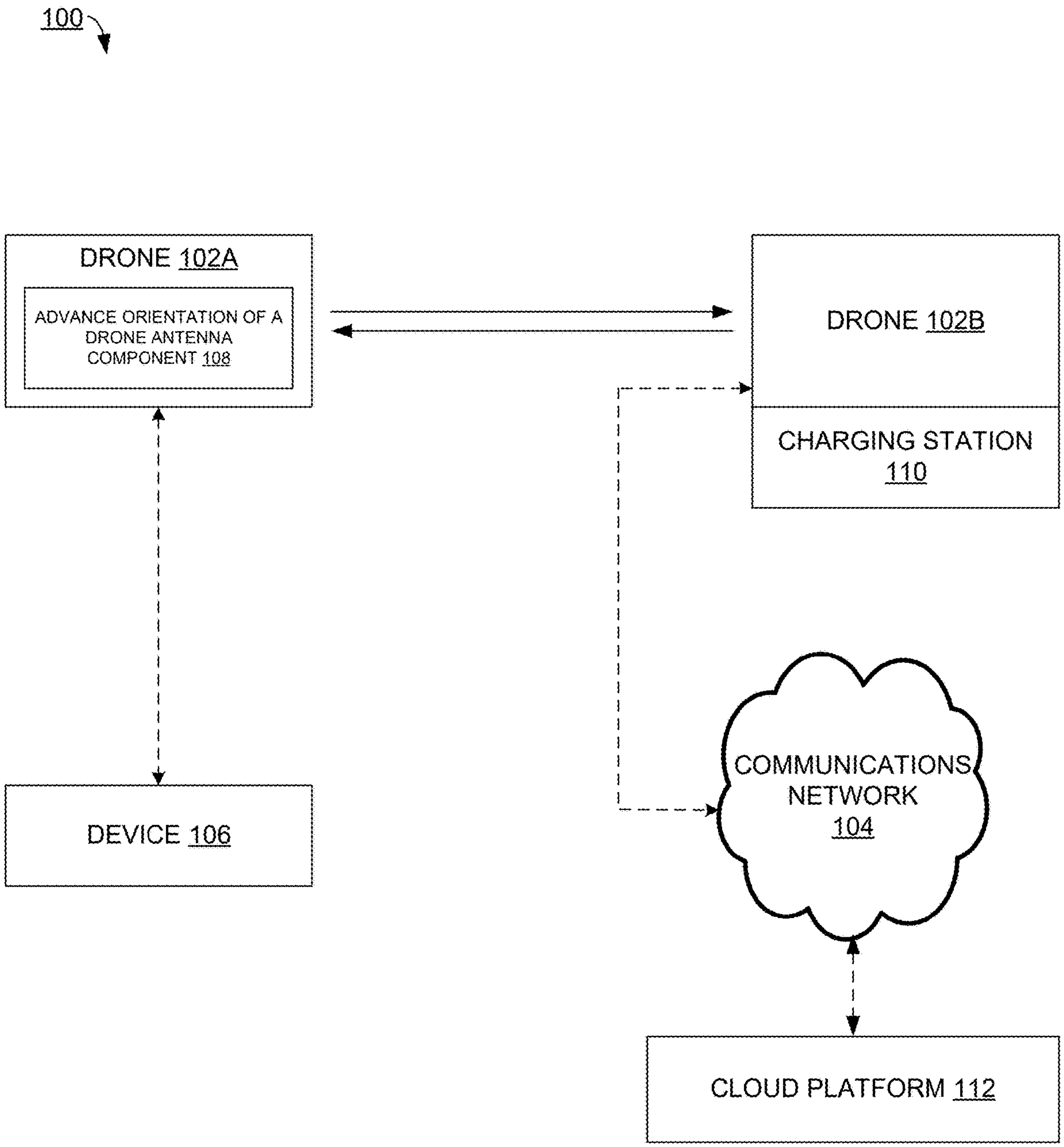
FIG. 1 illustrates an example system architecture that can facilitate advance orientation of a drone antenna, in accordance with an embodiment of this disclosure.

Remotely-located devices can be located where network infrastructure does not exist. It can be that data of these remotely-located devices' data is to be backed up (e.g., an Internet-of-Things (IoT) device, an operational technology (OT) device, a far edge device).

The present techniques can be implemented to facilitate transmission of data on scheduled-bases and in high bandwidth to keep the devices operational and remove an impact of the devices' data being unavailable.

A benefit of a wireless communication technology that uses light to transmit data (Li-Fi) is that can be used to transmit data at very high speeds.

A downside of Li-Fi can be that it is based on a wide light-spectrum (visible light, ultraviolet, and infrared).

Hence, for continuous communication, it can be that Li-Fi communication requires a clear line of communication between the transmitter and the receiver. Otherwise, it can be that the transmission cannot be transmitted directly due to topography constraints (e.g., mountains) or objects (e.g., buildings or trees).

The present techniques can be implemented to address these problems with an aeronautic-based solution is required. Where there is not a clear line of communication, there can be a secondary communication technique for ongoing and non-disruptive operation of devices that are communicating.

A device can comprise a Li-Fi transmitter, where the transmitter is positioned vertically (for a prevention of physical interference/constraints).

At a fixed cadence (which can be defined by a user), a drop that contains a Li-Fi receiver can fly over the device, where the drone serves as a data collector. Once the drone reaches its target, it can circle the target in an attempt to establish a stable Li-Fi connection.

If a stable Li-Fi connection cannot be established, the drone can establish communication via a wireless (Wi-Fi) communications protocol (which can communicate through various physical solid objects).

This approach can reduce an availability impact to devices that are served according to the present techniques.

When data has been collected, the drone can fly back to a nearest point where a stable network infrastructure exists. When the drone arrives at a charging station, it can begin transmitting the collected data to a cloud communications platform (or a computer, where a cloud communications platform, or a cloud platform, can generally comprise one or more computers that offer computer storage services).

The present techniques can be implemented to facilitate backing up remotely located devices' data to a cloud computing platform via a Li-Fi and Wi-Fi protocol switcher to establish non-interruptive communication. This backup can be performed even without an existing network infrastructure.

In conjunction with a drone backing up data from a device, a reduction of a Li-Fi-connectivity probing timeframe by Li-Fi antenna rotation correlated to topology pre-mapping can be performed.

As a drone approaches an edge device's location, pre-mapping information can be used to reduce a probing timeline in establishing a Li-Fi connection with the device. This pre-mapping information can be used, for example, to identify areas where a line-of-sight can be established between the drone and the device.

This mapping information can be leveraged alongside usage of a dynamic mechanical rotary-based Li-Fi antenna (or another type of antenna) for probing fine-tuning purposes. For example, the antenna on the drone can be pre-oriented in a manner that is projected to be an orientation with which a Li-Fi connection with the device can be established. By performing this antenna orientation before reaching the device, time can be saved in establishing a connection compared to starting to perform this antenna orientation once the device is reached.

That is, where the destination device's location is known, and the drone's dynamic movement is known, a dynamic mechanical rotary based Li-Fi antenna of the drone can be modified and adjusted while it is approaching an edge device-hence, diminishing the connectivity-probing timeline.

In some examples, pre-mapping information can indicate whether a drone can establish a Li-Fi connection with an edge device from various locations (for example, where a line-of-sight to an edge device's Li-Fi antenna can be established).

Example Architectures, Etc.

FIG. 1 illustrates an example system architecture 100 that can facilitate advance orientation of a drone antenna, in accordance with an embodiment of this disclosure.

System architecture 100 comprises drone 102A, drone 102B, communications network 104, device 106, advance orientation of a drone antenna component 108, charging station 110, and cloud platform 112.

System architecture 100 presents one logical example of implementing the present techniques, and it can be appreciated that there can be other example architectures.

Figure 13:
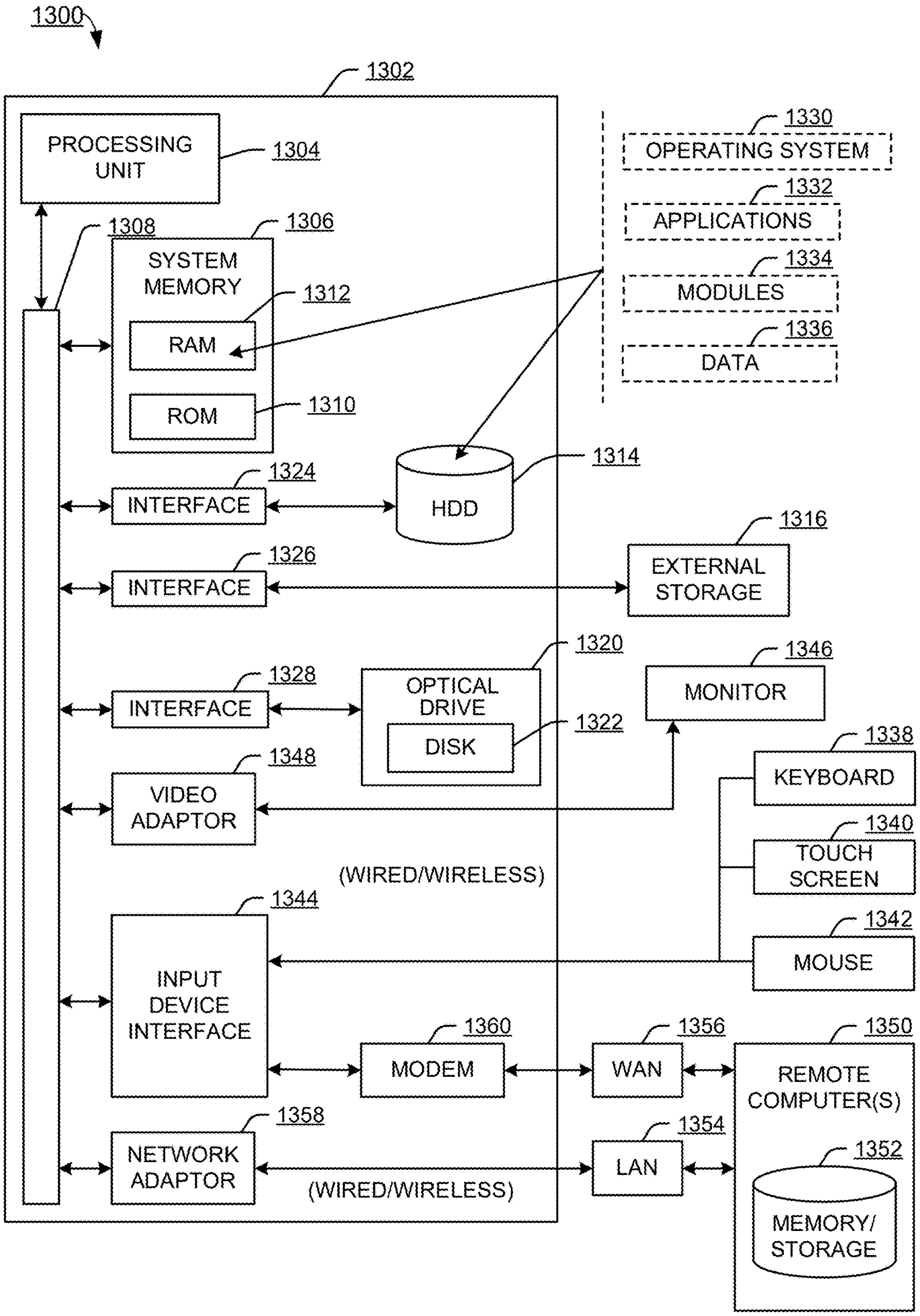
FIG. 13 illustrates an example block diagram of a computer operable to execute an embodiment of this disclosure.

Each of drone 102A, drone 102B, device 106, and/or cloud platform 112 can be implemented with part(s) of computing environment 1300 of FIG. 13. Communications network 104 can comprise a computer communications network, such as the Internet, or an intranet.

Device 106 (sometimes referred to as an edge device) can be a computing device that collects data (e.g., weather data from sensors), but lacks a durable network connection to upload that data to cloud platform 112. Drone 102A can travel to device 106, and establish a communications link with device 106.

While traveling to device 106, drone 102A can orient its antenna so as to facilitate establishing a Li-Fi connection with device 106. A Li-Fi antenna can use light to transmit data and involve establishing a line-of-sight connection with another antenna (e.g., to see the light transmitted from that antenna, as well as to transmit its own light to that antenna). By orienting its antenna before reaching device 102, drone 102A can reduce a time associated with establishing a Li-Fi connection with device 106, and correspondingly, reduce battery usage (e.g., energy expended in keeping the drone aloft while establishing the Li-Fi connection).

Drone 102A can attempt to establish a Li-Fi link, and where that is not possible, instead establish a Wi-Fi link. After collecting all new data from device 106 (or collecting data according to a criterion, such as an amount of data collected, an amount of time elapsed, or an amount of battery life left in drone 102A), drone 102A can travel toward charging and network infrastructure. This is illustrated with drone 102B.

Drone 102B can recharge at charging station 110. At this physical location, there can be sufficient network infrastructure (e.g., communications network 104) to upload data gathered from device 106 to cloud platform 112. In some examples, such as described herein, drone 102B can upload data at a physical location that is different from charging station 110—that is charging and uploading can be performed separately from each other.

Figure 2:
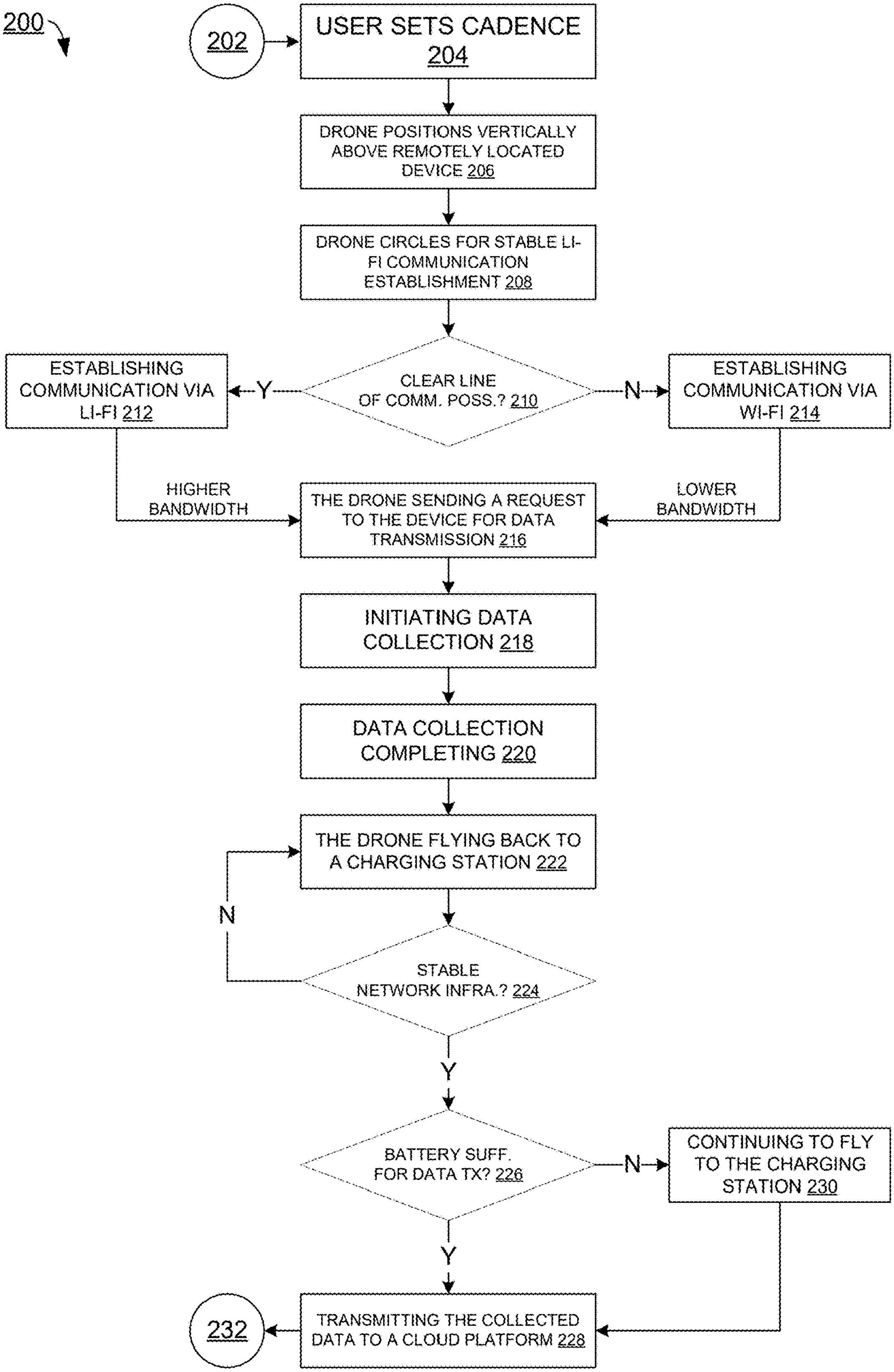
FIG. 2 illustrates an example process flow that can facilitate advance orientation of a drone antenna, in accordance with an embodiment of this disclosure.

In some examples, advance orientation of a drone antenna component 108 can implement part(s) of the process flows of FIGS. 2 and/or 6-12 to implement advance orientation of a drone antenna.

It can be appreciated that system architecture 100 is one example system architecture for advance orientation of a drone antenna, and that there can be other system architectures that facilitate advance orientation of a drone antenna.

FIG. 2 illustrates an example process flow 200 that can facilitate advance orientation of a drone antenna, in accordance with an embodiment of this disclosure. In some examples, one or more embodiments of process flow 200 can be implemented by advance orientation of a drone antenna component 108 of FIG. 1, or computing environment 1300 of FIG. 13.

It can be appreciated that the operating procedures of process flow 200 are example operating procedures, and that there can be embodiments that implement more or fewer operating procedures than are depicted, or that implement the depicted operating procedures in a different order than as depicted. In some examples, process flow 200 can be implemented in conjunction with one or more embodiments of one or more of process flow 600 of FIG. 6, process flow 700 of FIG. 7, process flow 800 of FIG. 8, process flow 900 or FIG. 9, process flow 1000 of FIG. 10, process flow 1100 of FIG. 11, and/or process flow 1200 of FIG. 12.

Process flow 200 begins with 202, and moves to operation 204.

Operation 204 depicts user sets cadence. This can be a cadence with which a drone backs up data from a device.

After operation 204, process flow 200 moves to operation 206.

Operation 206 depicts drone positions vertically above remotely located device. In some examples, before the drone positions itself vertically above a remotely located device (and while traveling to the device, or before beginning to travel to the device), the drone can pre-orient its antenna to facilitate establishing a Li-Fi connection with the remotely located device.

After operation 206, process flow 200 moves to operation 208.

Operation 208 depicts drone circles for stable Li-Fi communication establishment. In some examples, this can be affected by the drone having pre-oriented its antenna, where the drone has a known location from which it will attempt to establish the Li-Fi connection. It can be appreciated that the drone circling the remote device is one example, and there can be other examples of how the drone can move as part of establishing a Li-Fi connection with a remote device.

After operation 208, process flow 200 moves to operation 210.

Operation 210 depicts determining whether a clear line of communication is possible.

Where it is determined in operation 210 that a clear line of communication is possible, process flow 200 moves to operation 212. Instead, where it is determined in operation 210 that a clear line of communication is not possible, process flow 200 moves to operation 214.

Operation 212 is reached from operation 210 where it is determined that a clear line of communication is possible. Operation 212 depicts establishing communication via Li-Fi.

After operation 212, process flow 200 moves to operation 216.

Operation 214 is reached from operation 210 where it is determined that a clear line of communication is not possible. Operation 214 depicts establishing communication via Wi-Fi.

After operation 214, process flow 200 moves to operation 216.

Operation 216 is reached from operation 212 or from operation 214.

Operation 216 depicts the drone sending a request to the device for data transmission.

After operation 216, process flow 200 moves to operation 218.

Operation 218 depicts initiating data collection.

After operation 218, process flow 200 moves to operation 220.

Operation 220 depicts data collection having completed.

After operation 220, process flow 200 moves to operation 222.

Operation 222 is reached from operation 220, or from operation 224 where it is determined that stable network infrastructure does not exist. Operation 222 depicts the drone flying back to a charging station.

After operation 222, process flow 200 moves to operation 224.

Operation 224 depicts determining whether stable network infrastructure exists.

Where it is determined in operation 224 that stable network infrastructure exists, process flow 200 moves to operation 226. Instead, where it is determined in operation 224 that stable network infrastructure does not exist, process flow 200 returns to operation 222.

Operation 226 is reached from operation 224 where it is determined that stable network infrastructure exists. Operation 226 depicts determining whether battery is sufficient for data transmission.

Where it is determined in operation 226 that battery is sufficient for data transmission, process flow 200 moves to operation 228. Instead, where it is determined in operation 226 that battery is not sufficient for data transmission, process flow 200 moves to operation 230.

Operation 228 is reached from operation 226 where it is determined that battery is sufficient for data transmission. Operation 228 depicts transmitting the collected data to a cloud platform.

After operation 228, process flow 200 moves to 232, where process flow 200 ends.

Operation 230 is reached from operation 226 where it is determined that battery is not sufficient for data transmission. Operation 230 depicts continuing to fly to the charging station.

After operation 230, process flow 200 moves to operation 228.

Figure 3:
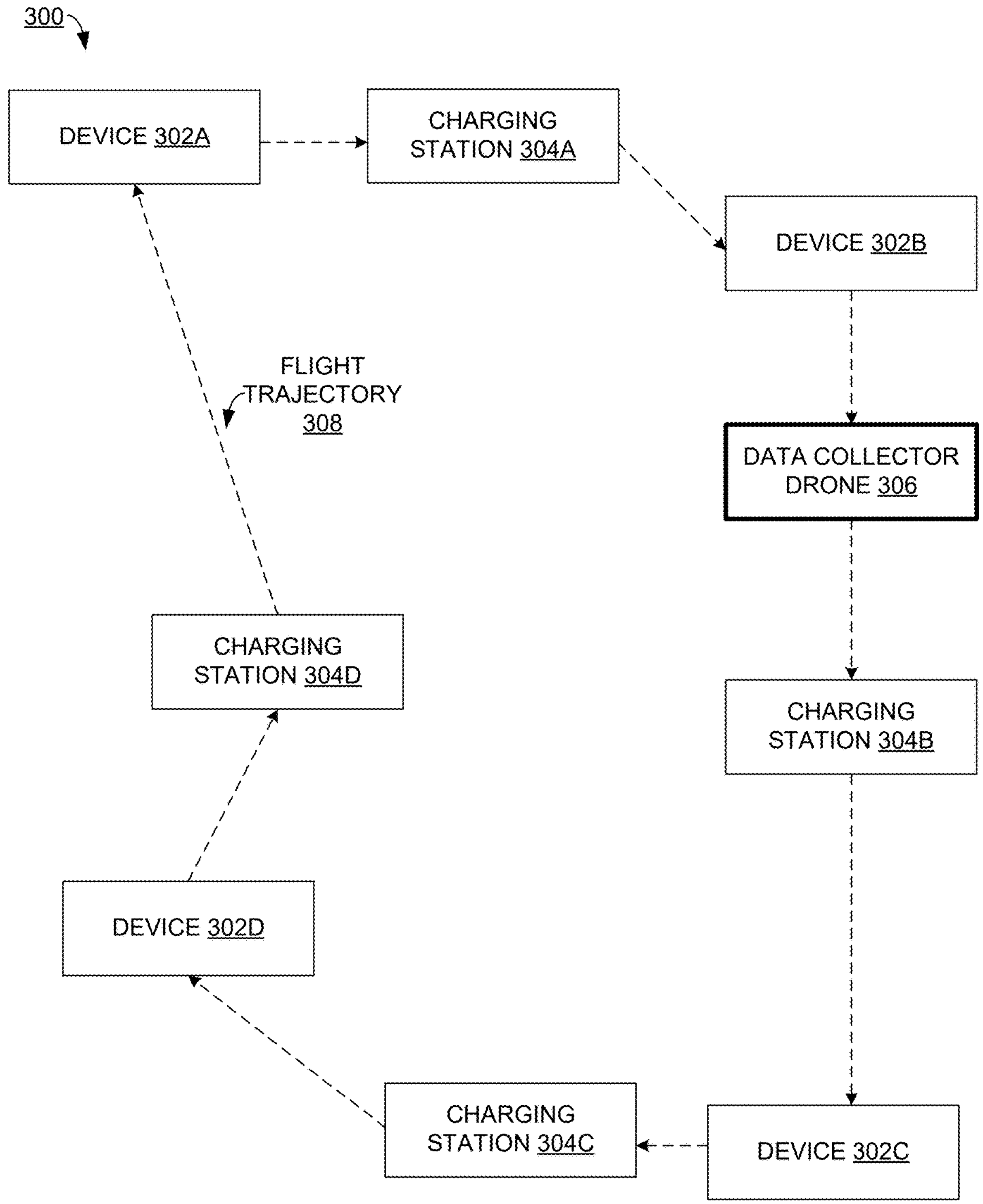
FIG. 3 illustrates an example path of a data collector drone that can facilitate advance orientation of a drone antenna, in accordance with an embodiment of this disclosure.

FIG. 3 illustrates an example path 300 of a data collector drone that can facilitate advance orientation of a drone antenna, in accordance with an embodiment of this disclosure. In some examples, parts of path 300 can be used by part(s) of system architecture 100 of FIG. 1 to facilitate advance orientation of a drone antenna.

Path 300 comprises device 302A, device 302B, device 302C, device 302D, charging station 304A, charging station 304B, charging station 304C, charging station 304D, data collector drone 306, and flight trajectory 308.

According to the present techniques, data collector drone 306 can fly along flight trajectory 308, collecting data from device 302A, device 302B, device 302C, device 302D (and uploading it to the cloud), and recharging at charging station 304A, charging station 304B, charging station 304C, at charging station 304D.

As data collector drone 306 flies along flight trajectory, data collector drone 306 can orient its antenna relative to device 302A as it approaches device 302A, relative to device 302B as it approaches device 302B, etc.

Figure 4:
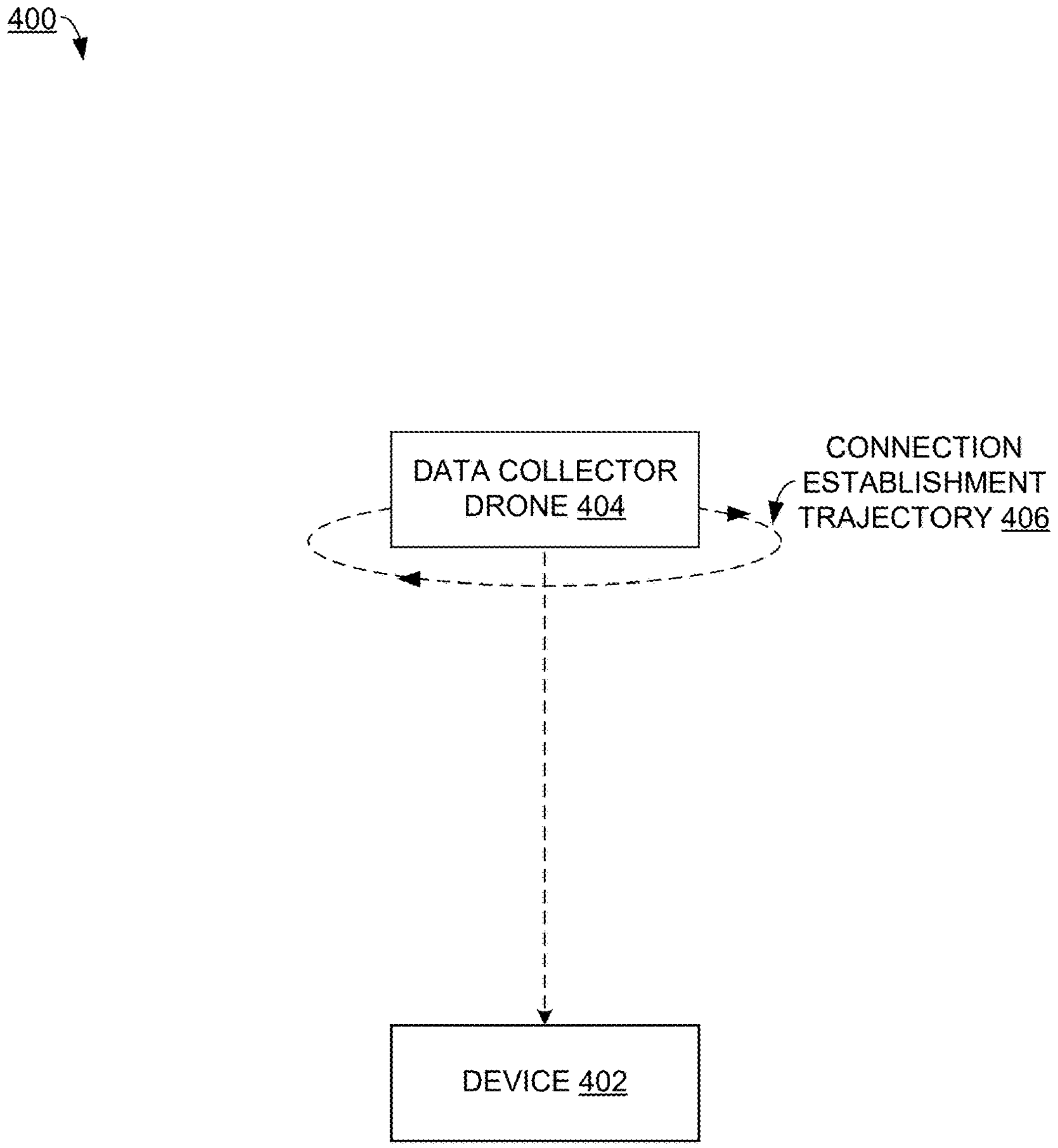
FIG. 4 illustrates an example of establishing a connection that can facilitate advance orientation of a drone antenna, in accordance with an embodiment of this disclosure.

FIG. 4 illustrates an example 400 of establishing a connection that can facilitate advance orientation of a drone antenna, in accordance with an embodiment of this disclosure. In some examples, parts of example 400 can be used by part(s) of system architecture 100 of FIG. 1 to facilitate advance orientation of a drone antenna.

System architecture 400 comprises device 402, data collector drone 404, and connection establishment trajectory 406.

When data collector drone 404 arrives at a device (e.g., device 402), data collector drone 404 can move in an area (e.g., a circle) above the device in an attempt to establish a Li-Fi connection. This can be because there can be a line-of-sight blockage between data collector drone 404 and the device from certain angles, but not others. And the blockages can change over time (e.g., plants growing).

Data collector drone 404 can have oriented its antenna while approaching device 402, according to the present techniques. Additionally, while at device 402, data collector drone 404 can further orient its antenna relative to device 402, such as to fine tune the orientation, or to reorient the antenna due to a change in the physical surroundings of device 402 that affect where data collector drone 404 can establish a line-of-sight with device 402.

Figure 5:
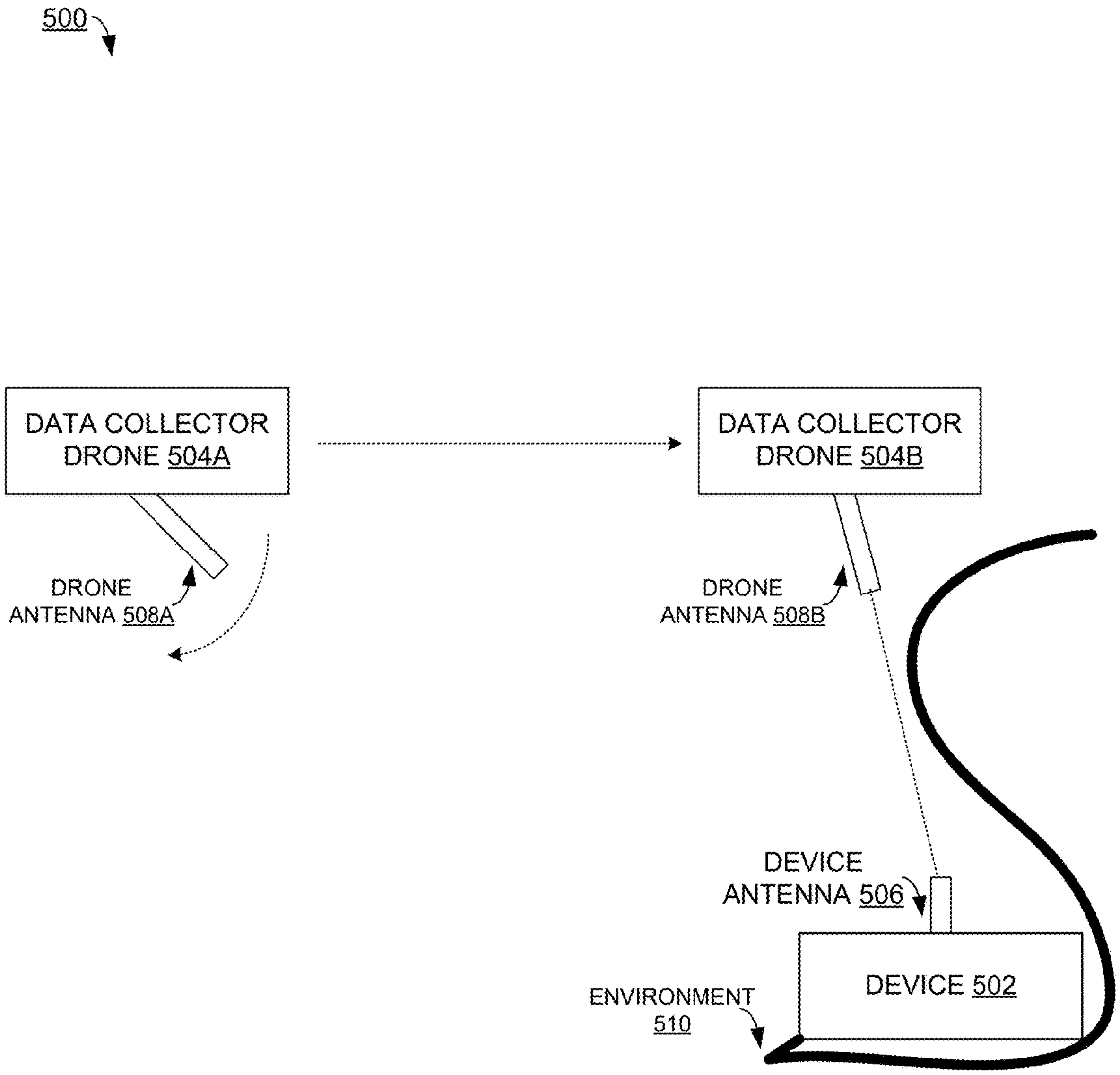
FIG. 5 illustrates an example of advance orientation of a drone antenna, in accordance with an embodiment of this disclosure.

FIG. 5 illustrates an example 500 of advance orientation of a drone antenna, in accordance with an embodiment of this disclosure. In some examples, parts of example 500 can be used by part(s) of system architecture 100 of FIG. 1 to facilitate advance orientation of a drone antenna.

Example 500 comprises device 502, data collector drone 504, device antenna 506, drone antenna 508, and environment 510.

In example 500, as data collector drone 504 flies toward device 502, data collector drone 504 can orient drone antenna 508 in a manner that facilitates establishing a communications connection with device 502 via device antenna 506. A current status of environment 510 (e.g., places where a line-of-sight to device antenna 506 is occluded) can be used by data collector drone 504 in this antenna orientation.

Example Process Flows

FIG. 6 illustrates an example process flow 600 that can facilitate advance orientation of a drone antenna, in accordance with an embodiment of this disclosure. In some examples, one or more embodiments of process flow 600 can be implemented by advance orientation of a drone antenna component 108 of FIG. 1, or computing environment 1300 of FIG. 13.

It can be appreciated that the operating procedures of process flow 600 are example operating procedures, and that there can be embodiments that implement more or fewer operating procedures than are depicted, or that implement the depicted operating procedures in a different order than as depicted. In some examples, process flow 600 can be implemented in conjunction with one or more embodiments of one or more of process flow 200 of FIG. 2, process flow 700 of FIG. 7, process flow 800 of FIG. 8, process flow 900 or FIG. 9, process flow 1000 of FIG. 10, process flow 1100 of FIG. 11, and/or process flow 1200 of FIG. 12.

Process flow 600 begins with 602, and moves to operation 604.

Operation 604 depicts maintaining mapping information applicable to a physical area that corresponds to a device. This mapping information can comprise information about a physical topology around a device, and/or vegetation located around a device. It can be used both for determining where a device is located, as well as determining the environment around the device, such as where around the device a line-of-sight can be established between the drone and the device.

After operation 604, process flow 600 moves to operation 606.

Operation 606 depicts physically navigating the system toward the device, wherein the device is configured to emit light-based communications substantially vertically, and wherein the device does not comprise any internet connectivity capability. That is, the system can be a drone (with a Li-Fi antenna) that can fly toward a device that can have Li-Fi connectivity (and WiFi connectivity), though that device otherwise lacks a connection to the Internet. That way, it can be that the drone can back data off the device, whereas the device cannot back its data up via the Internet on its own.

After operation 606, process flow 600 moves to operation 608.

Operation 608 depicts, while physically navigating the system toward the device and based on the mapping information, adjusting a position of the light-based communications antenna relative to another part of the system other than the light-based communications antenna. That is, the drone can orient its antenna (for establishing a Li-Fi connection with the device) while it travels toward the device, and this can be faster than waiting until the drone arrives at the device to start orienting its antenna.

In some examples, adjusting the position of the light-based communications antenna relative to the other part of the system based on the mapping information is performed responsive to movement of the system. That is, the drone's dynamic movement can be known by the drone, and adjusting the antenna can be performed based on how and/or where the drone is moving, so that the antenna can be oriented to facilitate establishing a Li-Fi connection with the device.

In some examples, physically navigating the system toward the device is performed based on the mapping information. That is, the mapping information can be used to fly the drone to the device (as well as orient the antenna).

In some examples, the mapping information comprises information indicative of a place where there is a line-of-sight from the system to the device. That is, the drone can use the mapping information both to determine where the device is and where the drone can establish a line-of-sight with the device.

In some examples, adjusting the position of the light-based communications antenna relative to the other part of the system is performed based on determining that a physical distance between the device and the system satisfies a nearness criterion. That is, orienting the antenna can begin when the drone gets sufficiently close to the device (e.g., within 500 meters (m) or 1,000 m).

In some examples, adjusting the position of the light-based communications antenna relative to the other part of the system is performed based on determining that a time for the system to reach the device satisfies a time criterion. That is, orienting the antenna can begin based on how long it will be until the drone gets to the device (e.g., the drone will be at the device in 60 seconds(s) or 180 s).

In some examples, adjusting the position of the light-based communications antenna relative to the other part of the system based on the mapping information is performed based on an indication of a physical location of the device in the mapping information. That is, the drone can orient the antenna based on where the device itself is located, and where a line-of-sight to the drone can be established (as opposed to the overall mapping information, more generally).

In some examples, adjusting the position of the light-based communications antenna relative to the other part of the system is performed based on determining that the mapping information satisfies a recency criterion. That is, the mapping information can be disregarded if it is sufficiently old (e.g., if it is more than 6 months old). A reason for this can be that it can be determined that the mapping information is unlikely to be accurate, so work by the drone to orient the antenna will likely consume battery without offering a speed advantage from the antenna being properly oriented for communication with the device.

After operation 608, process flow 600 moves to operation 610.

Operation 610 depicts, after physically navigating the system toward the device, attempting to establish a light-based communications channel with the device. That is, once the drone gets sufficiently near the device, it can use its (already-oriented) antenna to attempt to establish a Li-Fi connection with the device. In some examples (such as where the mapping information is outdated because plant life has grown in a way that obstructs some areas identified in the mapping information as line-of-sight paths to the device), there can be additional orientation of the antenna by the drone after arriving at the device.

After operation 610, process flow 600 moves to operation 612.

Operation 612 depicts, based on a result of the attempting indicating success in establishing the light-based communications channel with the device, receiving data from the device via the light-based communications channel. That is, where a Li-Fi connection between the drone and the device can be established, this connection can be used to upload data from the device and to the drone (such as for backing up the device's data).

After operation 612, process flow 600 moves to 614, where process flow 600 ends.

FIG. 7 illustrates an example process flow 700 that can facilitate advance orientation of a drone antenna, in accordance with an embodiment of this disclosure. In some examples, one or more embodiments of process flow 700 can be implemented by advance orientation of a drone antenna component 108 of FIG. 1, or computing environment 1300 of FIG. 13.

It can be appreciated that the operating procedures of process flow 700 are example operating procedures, and that there can be embodiments that implement more or fewer operating procedures than are depicted, or that implement the depicted operating procedures in a different order than as depicted. In some examples, process flow 700 can be implemented in conjunction with one or more embodiments of one or more of process flow 200 of FIG. 2, process flow 600 of FIG. 6, process flow 800 of FIG. 8, process flow 900 or FIG. 9, process flow 1000 of FIG. 10, process flow 1100 of FIG. 11, and/or process flow 1200 of FIG. 12.

Process flow 700 begins with 702, and moves to operation 704.

Operation 704 depicts moving a system toward a device, wherein the device is configured to emit light-based communications, and wherein the device omits internet connectivity. In some examples, operation 704 can be implemented in a similar manner as operation 606 of FIG. 6.

In some examples, moving the system at least in part comprises flying the system. That is, the system can comprise a drone that can fly.

After operation 704, process flow 700 moves to operation 706.

Operation 706 depicts, while moving the system toward the device, adjusting a position of a light-based communications antenna relative to another part of the system based on mapping information. In some examples, operation 706 can be implemented in a similar manner as operation 608 of FIG. 6.

In some examples, the mapping information comprises information about a location of plant life relative to the device, and the plant life changes in shape over time. That is, the mapping information can change because it includes information about lines-of-sight to the device, and these lines of sight can be affected by how plants that are near the device grow (or shrink) over time.

After operation 706, process flow 700 moves to operation 708.

Operation 708 depicts, after moving the system toward the device, attempting to establish a light-based communications channel with the device to produce a result. In some examples, operation 708 can be implemented in a similar manner as operation 610 of FIG. 6.

After operation 708, process flow 700 moves to operation 710.

Operation 710 depicts, based on the result indicating success in establishing the light-based communications channel with the device, receiving data from the device via the light-based communications channel. In some examples, operation 710 can be implemented in a similar manner as operation 612 of FIG. 6.

After operation 710, process flow 700 moves to 712, where process flow 700 ends.

FIG. 8 illustrates an example process flow 800 that can facilitate advance orientation of a drone antenna, in accordance with an embodiment of this disclosure. In some examples, one or more embodiments of process flow 800 can be implemented by advance orientation of a drone antenna component 108 of FIG. 1, or computing environment 1300 of FIG. 13.

It can be appreciated that the operating procedures of process flow 800 are example operating procedures, and that there can be embodiments that implement more or fewer operating procedures than are depicted, or that implement the depicted operating procedures in a different order than as depicted. In some examples, process flow 800 can be implemented in conjunction with one or more embodiments of one or more of process flow 200 of FIG. 2, process flow 600 of FIG. 6, process flow 700 of FIG. 7, process flow 900 or FIG. 9, process flow 1000 of FIG. 10, process flow 1100 of FIG. 11, and/or process flow 1200 of FIG. 12.

Process flow 800 begins with 802, and moves to operation 804.

Operation 804 depicts moving the system toward the device based on the mapping information, wherein the mapping information indicates a place where there is a line-of-sight from the system to the device.

After operation 804, process flow 800 moves to operation 806.

Operation 806 depicts establishing the light-based communications channel based on moving the system toward the device based on the mapping information more quickly than establishing the light-based communications channel based on moving the system toward the device independent of information about the place where there is the line-of-sight. That is, leveraging mapping information can reduce a probing timeline for establishing a Li-Fi connection with a device relative to not using mapping information.

After operation 806, process flow 800 moves to 808, where process flow 800 ends.

In some examples, operations 804-806 are performed in conjunction with process flow 700 of FIG. 7, and operations 804-806 combine to effectuate, wherein moving the system toward the device is performed based on the mapping information, wherein the mapping information indicates a place where there is a line-of-sight from the system to the device, and wherein a first amount of time associated with establishing the light-based communications channel based on moving the system toward the device based on the mapping information is less than a second amount of time associated with establishing the light-based communications channel based on moving the system toward the device independent of information about the place where there is the line-of-sight.

FIG. 9 illustrates an example process flow 900 that can facilitate advance orientation of a drone antenna, in accordance with an embodiment of this disclosure. In some examples, one or more embodiments of process flow 900 can be implemented by advance orientation of a drone antenna component 108 of FIG. 1, or computing environment 1300 of FIG. 13.

It can be appreciated that the operating procedures of process flow 900 are example operating procedures, and that there can be embodiments that implement more or fewer operating procedures than are depicted, or that implement the depicted operating procedures in a different order than as depicted. In some examples, process flow 900 can be implemented in conjunction with one or more embodiments of one or more of process flow 200 of FIG. 2, process flow 600 of FIG. 6, process flow 700 of FIG. 7, process flow 800 or FIG. 8, process flow 1000 of FIG. 10, process flow 1100 of FIG. 11, and/or process flow 1200 of FIG. 12.

Process flow 900 begins with 902, and moves to operation 904.

Operation 904 depicts moving the system toward the device based on the mapping information, wherein the mapping information indicates a place where there is a line-of-sight from the system to the device.

After operation 904, process flow 900 moves to operation 906.

Operation 906 depicts establishing the light-based communications channel based on adjusting the position of the light-based communications antenna while moving the system toward the device more quickly than establishing the light-based communications channel based on adjusting the position of the light-based communications antenna after moving the system toward the device. That is, pre-orienting a drone's antenna can reduce a probing timeline for establishing a Li-Fi connection with a device relative to not pre-orienting the drone's antenna.

After operation 906, process flow 900 moves to 908, where process flow 900 ends.

In some examples, operations 904-906 are performed in conjunction with process flow 700 of FIG. 7, and operations 904-906 combine to effectuate, wherein moving the system toward the device is performed based on the mapping information, wherein the mapping information indicates a place where there is a line-of-sight from the system to the device, and wherein a first amount of time associated with establishing the light-based communications channel based on adjusting the position of the light-based communications antenna while moving the system toward the device is less than a second amount of time associated with establishing the light-based communications channel based on adjusting the position of the light-based communications antenna after moving the system toward the device.

FIG. 10 illustrates an example process flow 1000 that can facilitate advance orientation of a drone antenna, in accordance with an embodiment of this disclosure. In some examples, one or more embodiments of process flow 1000 can be implemented by advance orientation of a drone antenna component 108 of FIG. 1, or computing environment 1300 of FIG. 13.

It can be appreciated that the operating procedures of process flow 1000 are example operating procedures, and that there can be embodiments that implement more or fewer operating procedures than are depicted, or that implement the depicted operating procedures in a different order than as depicted. In some examples, process flow 1000 can be implemented in conjunction with one or more embodiments of one or more of process flow 200 of FIG. 2, process flow 600 of FIG. 6, process flow 700 of FIG. 7, process flow 800 or FIG. 8, process flow 900 of FIG. 9, process flow 1100 of FIG. 11, and/or process flow 1200 of FIG. 12.

Process flow 1000 begins with 1002, and moves to operation 1004.

Operation 1004 depicts moving the system toward the device based on the mapping information, wherein the mapping information indicates a place where there is a line-of-sight from the system to the device.

After operation 1004, process flow 1000 moves to operation 1006.

Operation 1006 depicts establishing the light-based communications channel based on adjusting the position of the light-based communications antenna while moving the system toward the device more quickly than establishing the light-based communications channel based on refraining from adjusting the position of the light-based communications antenna. That is, orienting a drone's antenna (pre-orienting it or orienting it once the drone has arrived at the device) can reduce a probing timeline for establishing a Li-Fi connection with a device relative to not orienting the antenna.

After operation 1006, process flow 1000 moves to 1008, where process flow 1000 ends.

In some examples, operations 1004-1006 are performed in conjunction with process flow 700 of FIG. 7, and operations 1004-1006 combine to effectuate, wherein moving the system toward the device is performed based on the mapping information, wherein the mapping information indicates a place where there is a line-of-sight from the system to the device, and wherein a first amount of time associated with establishing the light-based communications channel based on adjusting the position of the light-based communications antenna while moving the system toward the device is less than a second amount of time associated with establishing the light-based communications channel based on refraining from adjusting the position of the light-based communications antenna.

FIG. 11 illustrates an example process flow 1100 that can facilitate advance orientation of a drone antenna, in accordance with an embodiment of this disclosure. In some examples, one or more embodiments of process flow 1100 can be implemented by advance orientation of a drone antenna component 108 of FIG. 1, or computing environment 1300 of FIG. 13.

It can be appreciated that the operating procedures of process flow 1100 are example operating procedures, and that there can be embodiments that implement more or fewer operating procedures than are depicted, or that implement the depicted operating procedures in a different order than as depicted. In some examples, process flow 1100 can be implemented in conjunction with one or more embodiments of one or more of process flow 200 of FIG. 2, process flow 600 of FIG. 6, process flow 700 of FIG. 7, process flow 800 or FIG. 8, process flow 900 of FIG. 9, process flow 1000 of FIG. 10, and/or process flow 1200 of FIG. 12.

Process flow 1100 begins with 1102, and moves to operation 1104.

Operation 1104 depicts, while moving the system toward a device and based on mapping information, adjusting a position of an antenna relative to another part of the system other than the antenna. In some examples, operation 1104 can be implemented in a similar manner as operation 608 of FIG. 6.

In some examples, the device is configured to emit light-based communications, and the device is not configured to be able to connect to any wide area network. That is, the drone can be used to establish a Li-Fi connection with the device to back up the device's data because the device lacks an Internet connection (such as because the device is located in a remote area) with which to back up its data.

In some examples, the antenna comprises a light-based communications antenna, and the communications channel comprises a light-based communications channel. That is, the communications antenna and communications channel can be a Li-Fi communications antenna and a Li-Fi communications channel, respectively.

After operation 1104, process flow 1100 moves to operation 1106.

Operation 1106 depicts, after moving the system toward the device, attempting to establish a communications channel with the device, and using the antenna. In some examples, operation 1106 can be implemented in a similar manner as operation 610 of FIG. 6.

After operation 1106, process flow 1100 moves to operation 1108.

Operation 1108 depicts, based on a result of the attempting indicating success in establishing the communications channel with the device, receiving data from the device via the communications channel. In some examples, operation 1108 can be implemented in a similar manner as operation 612 of FIG. 6.

After operation 1108, process flow 1100 moves to 1110, where process flow 1100 ends.

Figure 12:
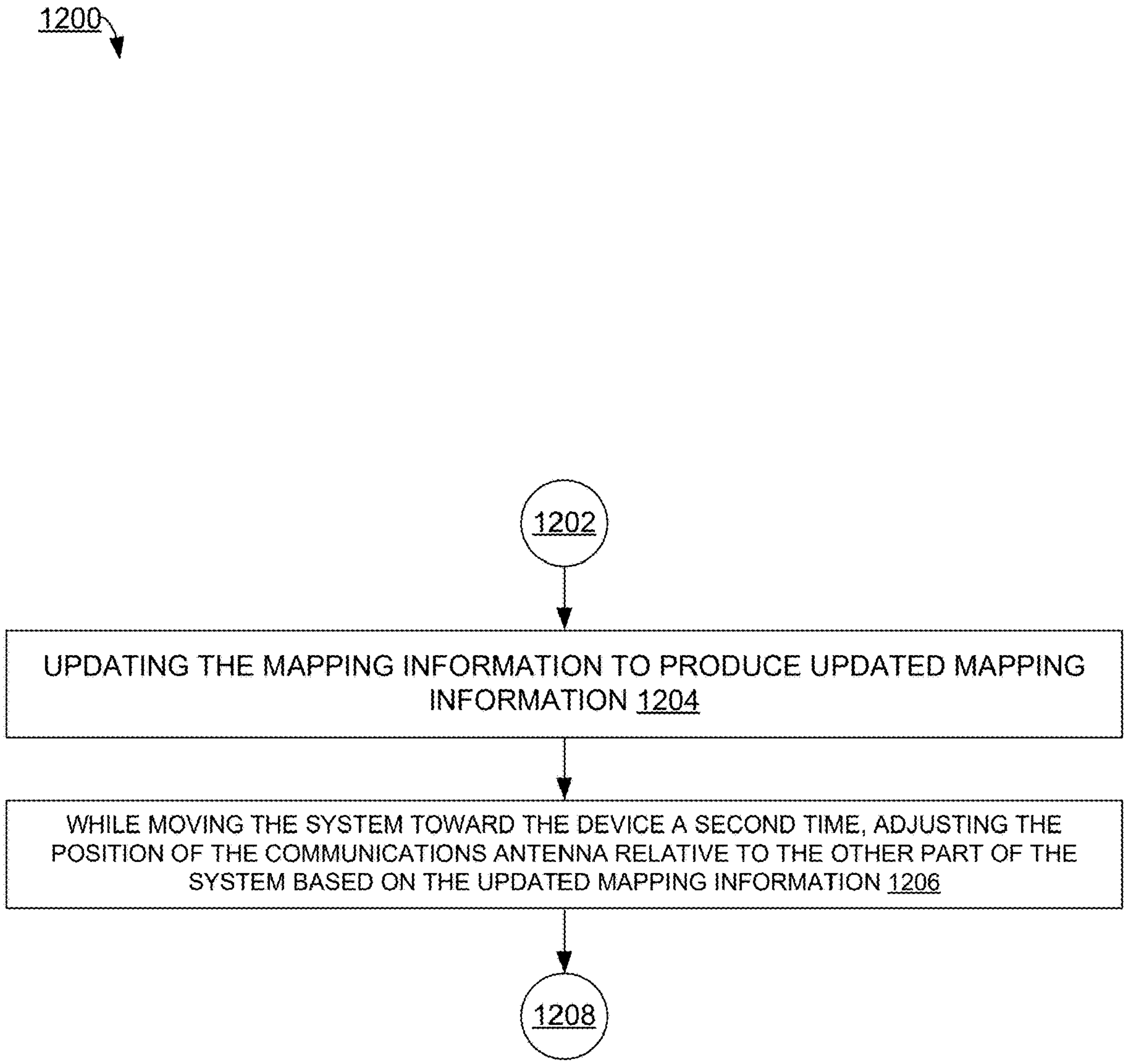
FIG. 12 illustrates another example process flow that can facilitate advance orientation of a drone antenna, in accordance with an embodiment of this disclosure.

FIG. 12 illustrates an example process flow 1200 that can facilitate advance orientation of a drone antenna, in accordance with an embodiment of this disclosure. In some examples, one or more embodiments of process flow 1200 can be implemented by advance orientation of a drone antenna component 108 of FIG. 1, or computing environment 1300 of FIG. 13.

It can be appreciated that the operating procedures of process flow 1200 are example operating procedures, and that there can be embodiments that implement more or fewer operating procedures than are depicted, or that implement the depicted operating procedures in a different order than as depicted. In some examples, process flow 1200 can be implemented in conjunction with one or more embodiments of one or more of process flow 200 of FIG. 2, process flow 600 of FIG. 6, process flow 700 of FIG. 7, process flow 800 or FIG. 8, process flow 900 of FIG. 9, process flow 1000 of FIG. 10, and/or process flow 1100 of FIG. 11.

Process flow 1200 begins with 1202, and moves to operation 1204.

In some examples, process flow 1200 is implemented in conjunction with process flow 1100 of FIG. 11, and moving the system toward the device comprises moving the system toward the device a first time.

Operation 1204 depicts updating the mapping information to produce updated mapping information. That is, mapping information of an area around a device can be updated over time, such as by periodically surveying the area (e.g., by the drone, or by another drone).

After operation 1204, process flow 1200 moves to operation 1206.

Operation 1206 depicts, while moving the system toward the device a second time, adjusting the position of the communications antenna relative to the other part of the system based on the updated mapping information. That is, as the mapping information is updated over time, the most recent mapping information can be used to orient a drone's antenna.

After operation 1206, process flow 1200 moves to 1208, where process flow 1200 ends.

Example Operating Environment

In order to provide additional context for various embodiments described herein, FIG. 13 and the following discussion are intended to provide a brief, general description of a suitable computing environment 1300 in which the various embodiments of the embodiment described herein can be implemented.

For example, parts of computing environment 1300 can be used to implement one or more embodiments of drone 102A, drone 102B, device 106, and/or cloud platform 112.

In some examples, computing environment 1300 can implement one or more embodiments of the process flows of FIGS. 2 and/or 6-12 to facilitate advance orientation of a drone antenna.

While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the various methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 13, the example environment 1300 for implementing various embodiments described herein includes a computer 1302, the computer 1302 including a processing unit 1304, a system memory 1306 and a system bus 1308. The system bus 1308 couples system components including, but not limited to, the system memory 1306 to the processing unit 1304. The processing unit 1304 can be any of various commercially available processors. Dual microprocessors and other multi-processor architectures can also be employed as the processing unit 1304.

The system bus 1308 can be any of several types of bus structure that can further interconnect to a memory bus (with or without a memory controller), a peripheral bus, and a local bus using any of a variety of commercially available bus architectures. The system memory 1306 includes ROM 1310 and RAM 1312. A basic input/output system (BIOS) can be stored in a nonvolatile storage such as ROM, erasable programmable read only memory (EPROM), EEPROM, which BIOS contains the basic routines that help to transfer information between elements within the computer 1302, such as during startup. The RAM 1312 can also include a high-speed RAM such as static RAM for caching data.

The computer 1302 further includes an internal hard disk drive (HDD) 1314 (e.g., EIDE, SATA), one or more external storage devices 1316 (e.g., a magnetic floppy disk drive (FDD) 1316, a memory stick or flash drive reader, a memory card reader, etc.) and an optical disk drive 1320 (e.g., which can read or write from a CD-ROM disc, a DVD, a BD, etc.). While the internal HDD 1314 is illustrated as located within the computer 1302, the internal HDD 1314 can also be configured for external use in a suitable chassis (not shown). Additionally, while not shown in environment 1300, a solid state drive (SSD) could be used in addition to, or in place of, an HDD 1314. The HDD 1314, external storage device(s) 1316 and optical disk drive 1320 can be connected to the system bus 1308 by an HDD interface 1324, an external storage interface 1326 and an optical drive interface 1328, respectively. The interface 1324 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 1302, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1312, including an operating system 1330, one or more application programs 1332, other program modules 1334 and program data 1336. All or portions of the operating system, applications, modules, and/or data can also be cached in the RAM 1312. The systems and methods described herein can be implemented utilizing various commercially available operating systems or combinations of operating systems.

Computer 1302 can optionally comprise emulation technologies. For example, a hypervisor (not shown) or other intermediary can emulate a hardware environment for operating system 1330, and the emulated hardware can optionally be different from the hardware illustrated in FIG. 13. In such an embodiment, operating system 1330 can comprise one virtual machine (VM) of multiple VMs hosted at computer 1302. Furthermore, operating system 1330 can provide runtime environments, such as the Java runtime environment or the .NET framework, for applications 1332. Runtime environments are consistent execution environments that allow applications 1332 to run on any operating system that includes the runtime environment. Similarly, operating system 1330 can support containers, and applications 1332 can be in the form of containers, which are lightweight, standalone, executable packages of software that include, e.g., code, runtime, system tools, system libraries and settings for an application.

Further, computer 1302 can be enabled with a security module, such as a trusted processing module (TPM). For instance, with a TPM, boot components hash next in time boot components, and wait for a match of results to secured values, before loading a next boot component. This process can take place at any layer in the code execution stack of computer 1302, e.g., applied at the application execution level or at the operating system (OS) kernel level, thereby enabling security at any level of code execution.

A user can enter commands and information into the computer 1302 through one or more wired/wireless input devices, e.g., a keyboard 1338, a touch screen 1340, and a pointing device, such as a mouse 1342. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1304 through an input device interface 1344 that can be coupled to the system bus 1308, but can be connected by other interfaces, such as a parallel port, an IEEE 1394 serial port, a game port, a USB port, an IR interface, a BLUETOOTH® interface, etc.

A monitor 1346 or other type of display device can be also connected to the system bus 1308 via an interface, such as a video adapter 1348. In addition to the monitor 1346, a computer typically includes other peripheral output devices (not shown), such as speakers, printers, etc.

The computer 1302 can operate in a networked environment using logical connections via wired and/or wireless communications to one or more remote computers, such as a remote computer(s) 1350. The remote computer(s) 1350 can be a workstation, a server computer, a router, a personal computer, portable computer, microprocessor-based entertainment appliance, a peer device or other common network node, and typically includes many or all of the elements described relative to the computer 1302, although, for purposes of brevity, only a memory/storage device 1352 is illustrated. The logical connections depicted include wired/wireless connectivity to a local area network (LAN) 1354 and/or larger networks, e.g., a wide area network (WAN) 1356. Such LAN and WAN networking environments are commonplace in offices and companies, and facilitate enterprise-wide computer networks, such as intranets, all of which can connect to a global communications network, e.g., the Internet.

When used in a LAN networking environment, the computer 1302 can be connected to the local network 1354 through a wired and/or wireless communication network interface or adapter 1358. The adapter 1358 can facilitate wired or wireless communication to the LAN 1354, which can also include a wireless access point (AP) disposed thereon for communicating with the adapter 1358 in a wireless mode.

When used in a WAN networking environment, the computer 1302 can include a modem 1360 or can be connected to a communications server on the WAN 1356 via other means for establishing communications over the WAN 1356, such as by way of the Internet. The modem 1360, which can be internal or external and a wired or wireless device, can be connected to the system bus 1308 via the input device interface 1344. In a networked environment, program modules depicted relative to the computer 1302 or portions thereof, can be stored in the remote memory/storage device 1352. It will be appreciated that the network connections shown are examples, and other means of establishing a communications link between the computers can be used.

When used in either a LAN or WAN networking environment, the computer 1302 can access cloud storage systems or other network-based storage systems in addition to, or in place of, external storage devices 1316 as described above. Generally, a connection between the computer 1302 and a cloud storage system can be established over a LAN 1354 or WAN 1356 e.g., by the adapter 1358 or modem 1360, respectively. Upon connecting the computer 1302 to an associated cloud storage system, the external storage interface 1326 can, with the aid of the adapter 1358 and/or modem 1360, manage storage provided by the cloud storage system as it would other types of external storage. For instance, the external storage interface 1326 can be configured to provide access to cloud storage sources as if those sources were physically connected to the computer 1302.

The computer 1302 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

Conclusion

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory in a single machine or multiple machines. Additionally, a processor can refer to an integrated circuit, a state machine, an application specific integrated circuit (ASIC), a digital signal processor (DSP), a programmable gate array (PGA) including a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units. One or more processors can be utilized in supporting a virtualized computing environment. The virtualized computing environment may support one or more virtual machines representing computers, servers, or other computing devices. In such virtualized virtual machines, components such as processors and storage devices may be virtualized or logically represented. For instance, when a processor executes instructions to perform "operations", this could include the processor performing the operations directly and/or facilitating, directing, or cooperating with another device or component to perform the operations.

In the subject specification, terms such as "datastore," data storage," "database," "cache," and substantially any other information storage component relevant to operation and functionality of a component, refer to "memory components," or entities embodied in a "memory" or components comprising the memory. It will be appreciated that the memory components, or computer-readable storage media, described herein can be either volatile memory or nonvolatile storage, or can include both volatile and nonvolatile storage. By way of illustration, and not limitation, nonvolatile storage can include ROM, programmable ROM (PROM), EPROM, EEPROM, or flash memory. Volatile memory can include RAM, which acts as external cache memory. By way of illustration and not limitation, RAM can be available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SL-DRAM), and direct Rambus RAM (DRRAM). Additionally, the disclosed memory components of systems or methods herein are intended to comprise, without being limited to comprising, these and any other suitable types of memory.

The illustrated embodiments of the disclosure can be practiced in distributed computing environments where certain tasks are performed by remote processing devices that are linked through a communications network. In a distributed computing environment, program modules can be located in both local and remote memory storage devices.

The systems and processes described above can be embodied within hardware, such as a single integrated circuit (IC) chip, multiple ICs, an ASIC, or the like. Further, the order in which some or all of the process blocks appear in each process should not be deemed limiting. Rather, it should be understood that some of the process blocks can be executed in a variety of orders that are not all of which may be explicitly illustrated herein.

As used in this application, the terms "component," "module," "system," "interface," "cluster," "server," "node," or the like are generally intended to refer to a computer-related entity, either hardware, a combination of hardware and software, software, or software in execution or an entity related to an operational machine with one or more specific functionalities. For example, a component can be, but is not limited to being, a process running on a processor, a processor, an object, an executable, a thread of execution, computer-executable instruction(s), a program, and/or a computer. By way of illustration, both an application running on a controller and the controller can be a component. One or more components may reside within a process and/or thread of execution and a component may be localized on one computer and/or distributed between two or more computers. As another example, an interface can include input/output (I/O) components as well as associated processor, application, and/or application programming interface (API) components.

Further, the various embodiments can be implemented as a method, apparatus, or article of manufacture using standard programming and/or engineering techniques to produce software, firmware, hardware, or any combination thereof to control a computer to implement one or more embodiments of the disclosed subject matter. An article of manufacture can encompass a computer program accessible from any computer-readable device or computer-readable storage/communications media. For example, computer readable storage media can include but are not limited to magnetic storage devices (e.g., hard disk, floppy disk, magnetic strips . . . ), optical discs (e.g., CD, DVD . . . ), smart cards, and flash memory devices (e.g., card, stick, key drive . . . ). Of course, those skilled in the art will recognize many modifications can be made to this configuration without departing from the scope or spirit of the various embodiments.

In addition, the word "example" or "exemplary" is used herein to mean serving as an example, instance, or illustration. Any embodiment or design described herein as "exemplary" is not necessarily to be construed as preferred or advantageous over other embodiments or designs. Rather, use of the word exemplary is intended to present concepts in a concrete fashion. As used in this application, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

What has been described above includes examples of the present specification. It is, of course, not possible to describe every conceivable combination of components or methods for purposes of describing the present specification, but one of ordinary skill in the art may recognize that many further combinations and permutations of the present specification are possible. Accordingly, the present specification is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system, comprising:

a light-based communications antenna; and at least one memory that stores executable instructions that, when executed by at least one processor, facilitate performance of operations, comprising:

maintaining mapping information applicable to a physical area that corresponds to a device;

physically navigating the system toward the device, wherein the device is configured to emit light-based communications substantially vertically, and wherein the device does not comprise any internet connectivity capability;

while physically navigating the system toward the device and based on the mapping information, adjusting a position of the light-based communications antenna relative to another part of the system other than the light-based communications antenna;

after physically navigating the system toward the device, attempting to establish a light-based communications channel with the device; and based on a result of the attempting indicating success in establishing the light-based communications channel with the device, receiving data from the device via the light-based communications channel.

2. The system of claim 1, wherein adjusting the position of the light-based communications antenna relative to the other part of the system based on the mapping information is performed responsive to movement of the system.

3. The system of claim 1, wherein the light-based communications antenna comprises a mechanical rotary-based light-based communications antenna.

4. The system of claim 1, wherein physically navigating the system toward the device is performed based on the mapping information.

5. The system of claim 1, wherein the mapping information comprises information indicative of a place where there is a line-of-sight from the system to the device.

6. The system of claim 1, wherein adjusting the position of the light-based communications antenna relative to the other part of the system is performed based on determining that a physical distance between the device and the system satisfies a nearness criterion.

7. The system of claim 1, wherein adjusting the position of the light-based communications antenna relative to the other part of the system is performed based on determining that a time for the system to reach the device satisfies a time criterion.

8. The system of claim 1, wherein adjusting the position of the light-based communications antenna relative to the other part of the system based on the mapping information is performed based on an indication of a physical location of the device in the mapping information.

9. The system of claim 1, wherein adjusting the position of the light-based communications antenna relative to the other part of the system is performed based on determining that the mapping information satisfies a recency criterion.

10. A method, comprising:

moving a system, by the system comprising at least one processor, toward a device, wherein the device is configured to emit light-based communications, and wherein the device omits internet connectivity;

while moving the system toward the device, adjusting, by the system, a position of a light-based communications antenna relative to another part of the system based on mapping information;

after moving the system toward the device, attempting, by the system, to establish a light-based communications channel with the device to produce a result; and based on the result indicating success in establishing the light-based communications channel with the device, receiving, by the system, data from the device via the light-based communications channel.

11. The method of claim 10, wherein moving the system at least in part comprises flying the system.

12. The method of claim 10, wherein moving the system toward the device is performed based on the mapping information, wherein the mapping information indicates a place where there is a line-of-sight from the system to the device, and wherein a first amount of time associated with establishing the light-based communications channel based on moving the system toward the device based on the mapping information is less than a second amount of time associated with establishing the light-based communications channel based on moving the system toward the device independent of information about the place where there is the line-of-sight.

13. The method of claim 10, wherein moving the system toward the device is performed based on the mapping information, wherein the mapping information indicates a place where there is a line-of-sight from the system to the device, and wherein a first amount of time associated with establishing the light-based communications channel based on adjusting the position of the light-based communications antenna while moving the system toward the device is less than a second amount of time associated with establishing the light-based communications channel based on adjusting the position of the light-based communications antenna after moving the system toward the device.

14. The method of claim 10, wherein moving the system toward the device is performed based on the mapping information, wherein the mapping information indicates a place where there is a line-of-sight from the system to the device, and wherein a first amount of time associated with establishing the light-based communications channel based on adjusting the position of the light-based communications antenna while moving the system toward the device is less than a second amount of time associated with establishing the light-based communications channel based on refraining from adjusting the position of the light-based communications antenna.

15. A non-transitory computer-readable medium comprising instructions that, in response to execution, cause a system comprising at least one processor to perform operations, comprising:

while moving the system toward a device and based on mapping information, adjusting a position of an antenna relative to another part of the system other than the antenna;

after moving the system toward the device, attempting to establish a communications channel with the device, and using the antenna; and based on a result of the attempting indicating success in establishing the communications channel with the device, receiving data from the device via the communications channel.

16. The non-transitory computer-readable medium of claim 15, wherein the mapping information comprises information about a location of plant life relative to the device, and wherein the plant life changes in shape over time.

17. The non-transitory computer-readable medium of claim 15, wherein the operations further comprise:

updating the mapping information to produce updated mapping information.

18. The non-transitory computer-readable medium of claim 17, wherein moving the system toward the device comprises moving the system toward the device a first time, and wherein the operations further comprise:

while moving the system toward the device a second time, adjusting the position of the communications antenna relative to the other part of the system based on the updated mapping information.

19. The non-transitory computer-readable medium of claim 15, wherein the device is configured to emit light-based communications, and wherein the device is not configured to be able to connect to any wide area network.

20. The non-transitory computer-readable medium of claim 15, wherein the antenna comprises a light-based communications antenna, and wherein the communications channel comprises a light-based communications channel.

* * * * *